Oct. 16, 1945.    E. W. MILLER    2,387,166
AUTOMATIC GEAR GRINDING MACHINE
Filed Aug. 29, 1941    9 Sheets-Sheet 1
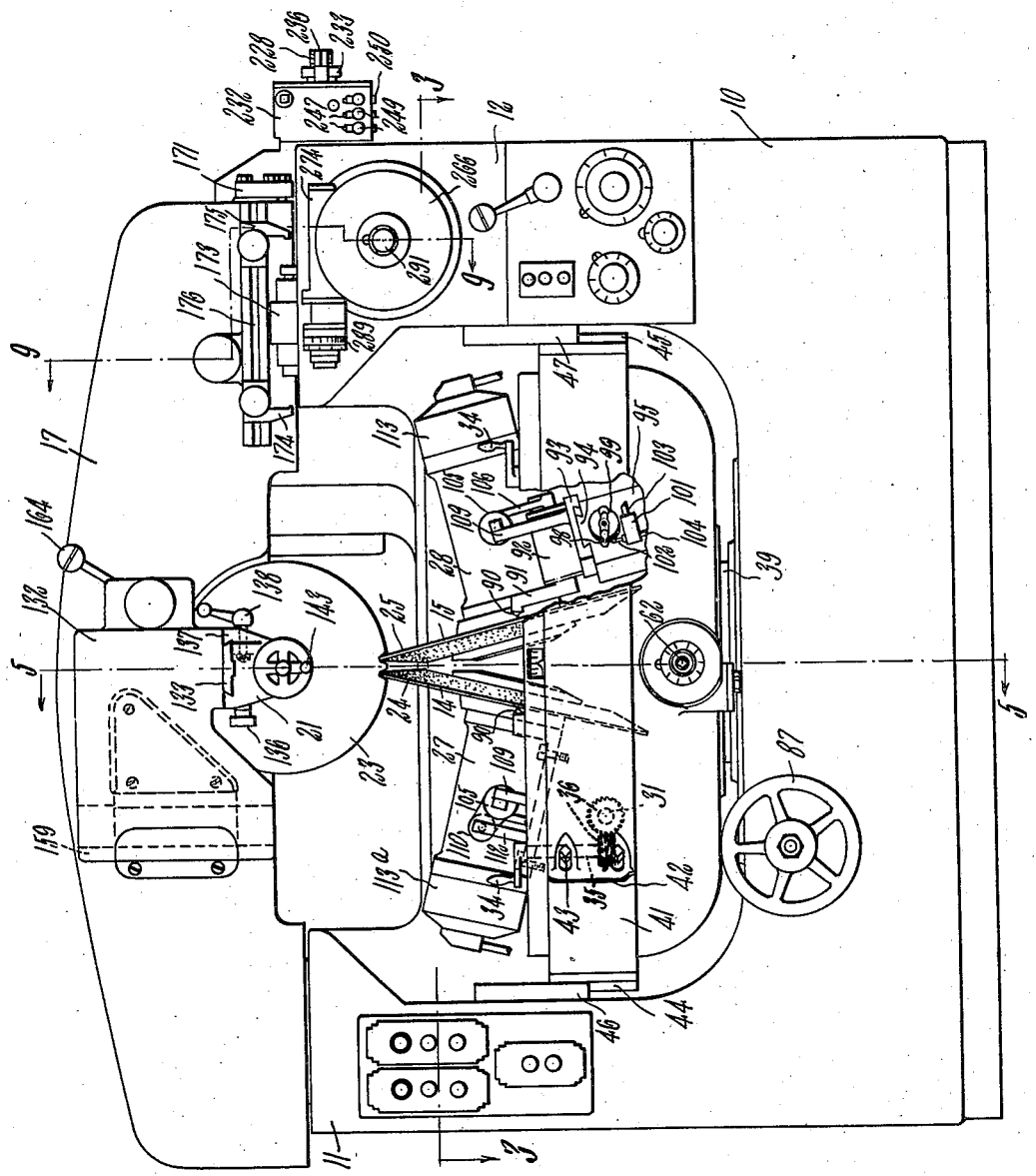

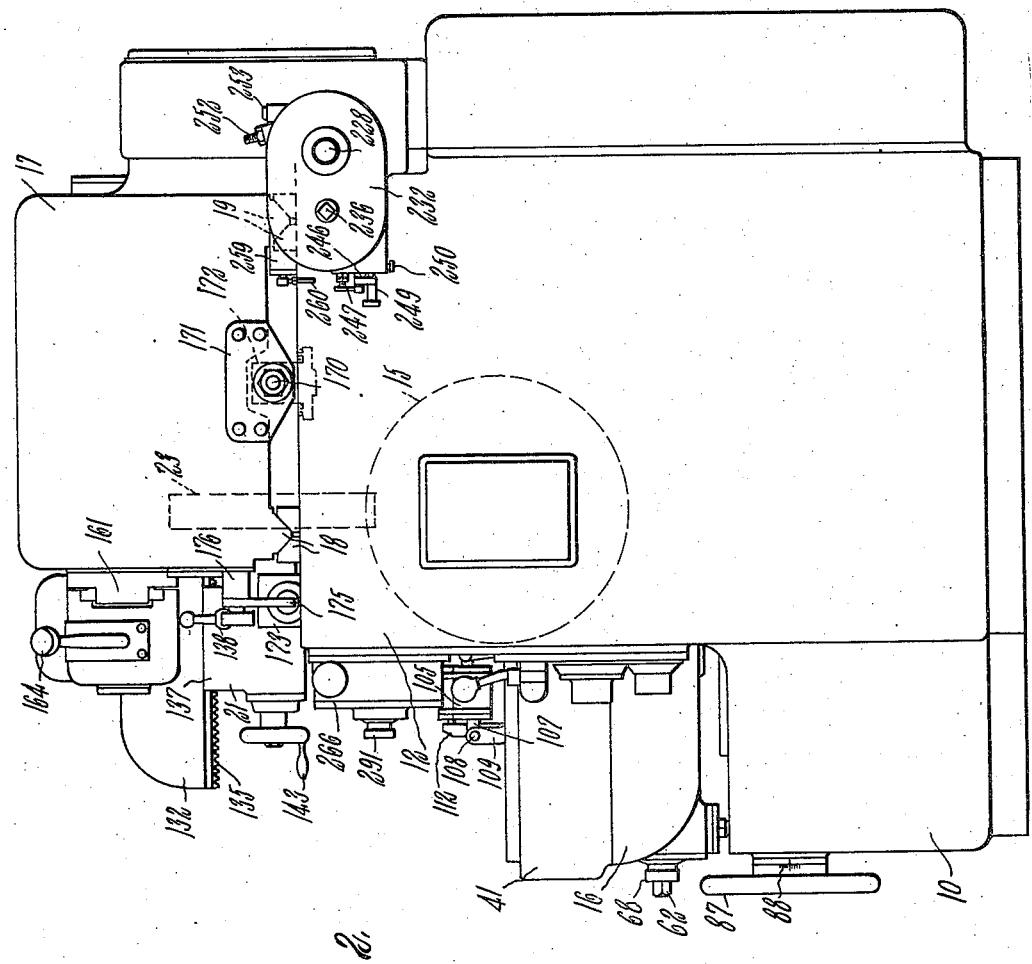

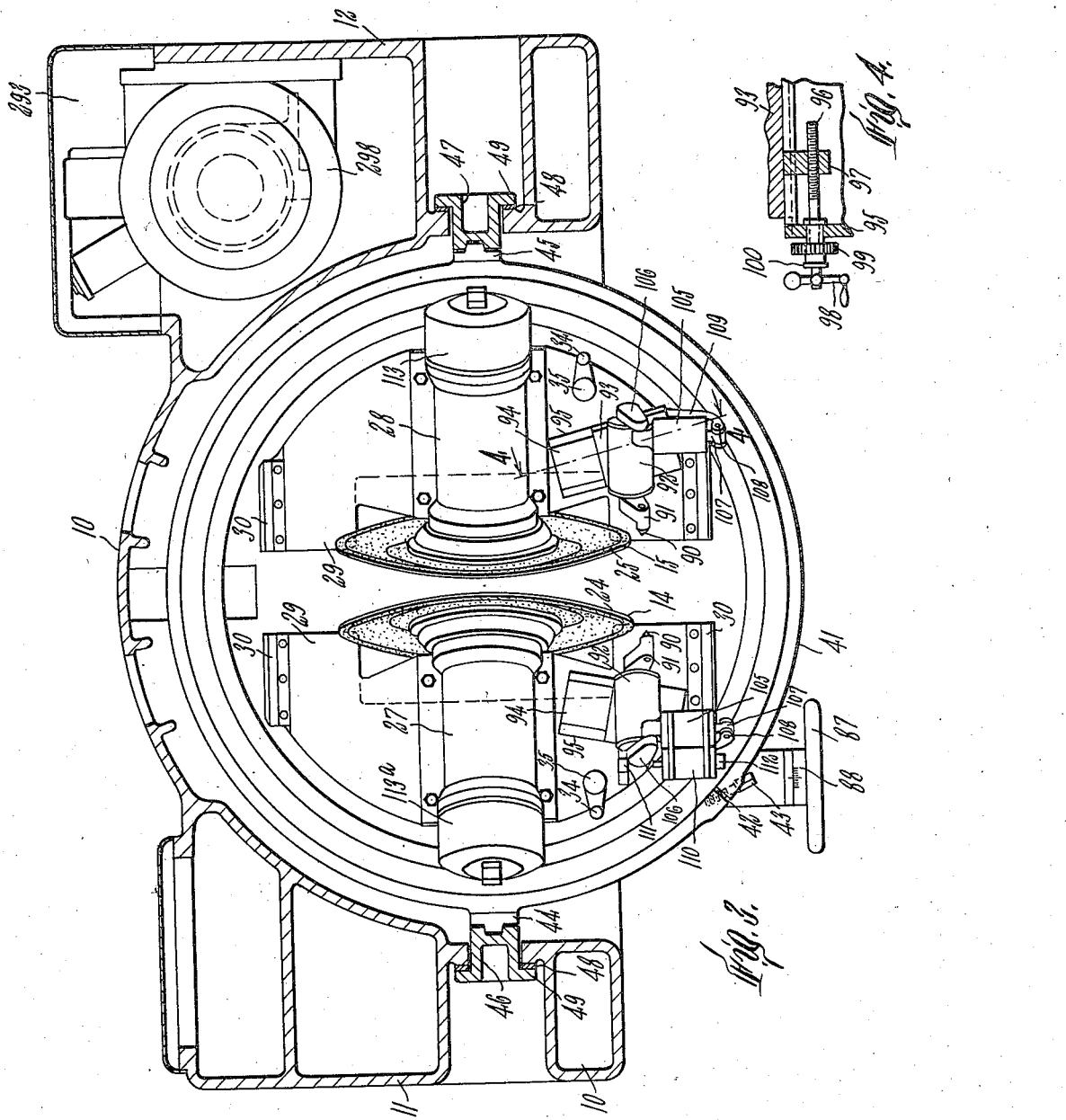

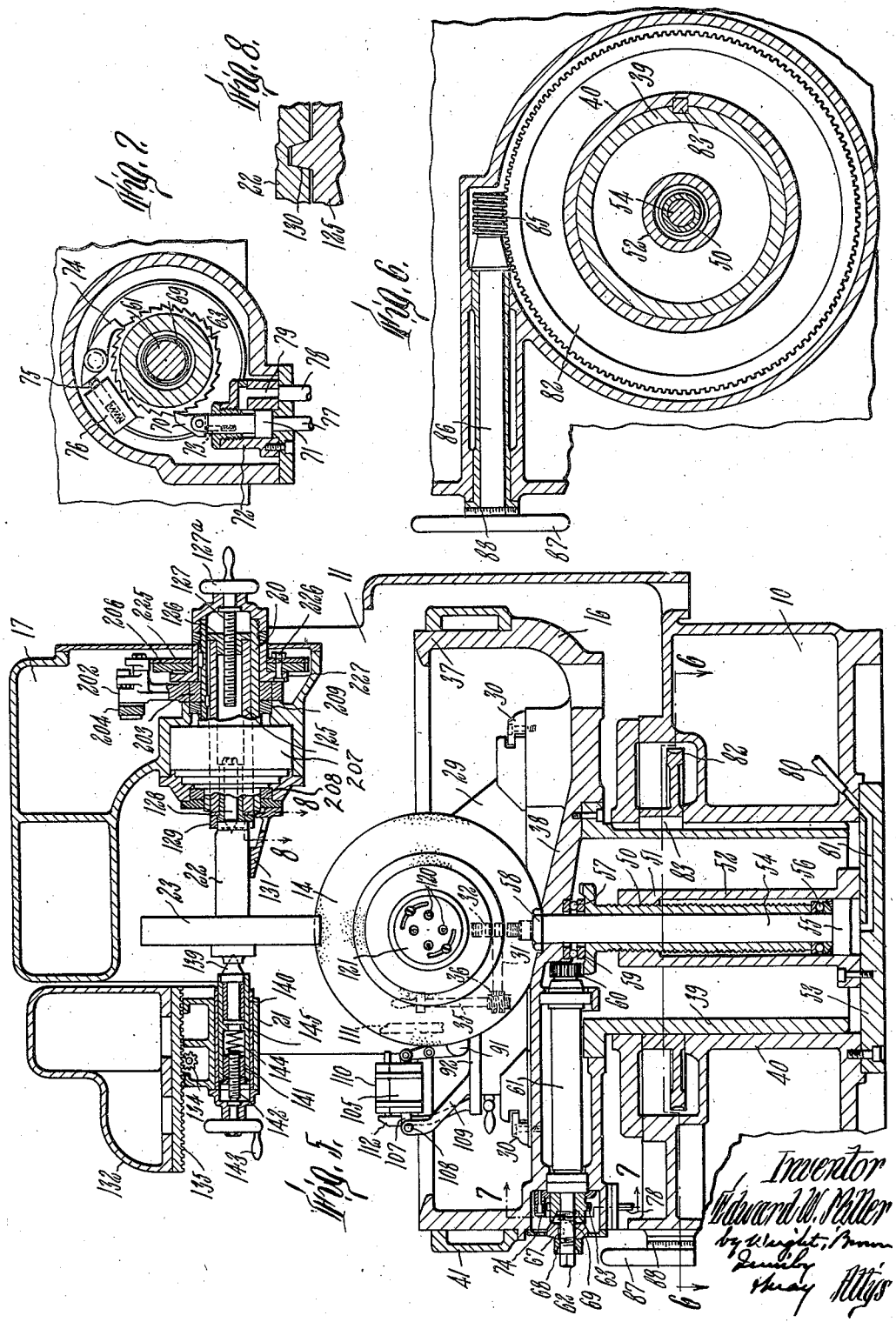

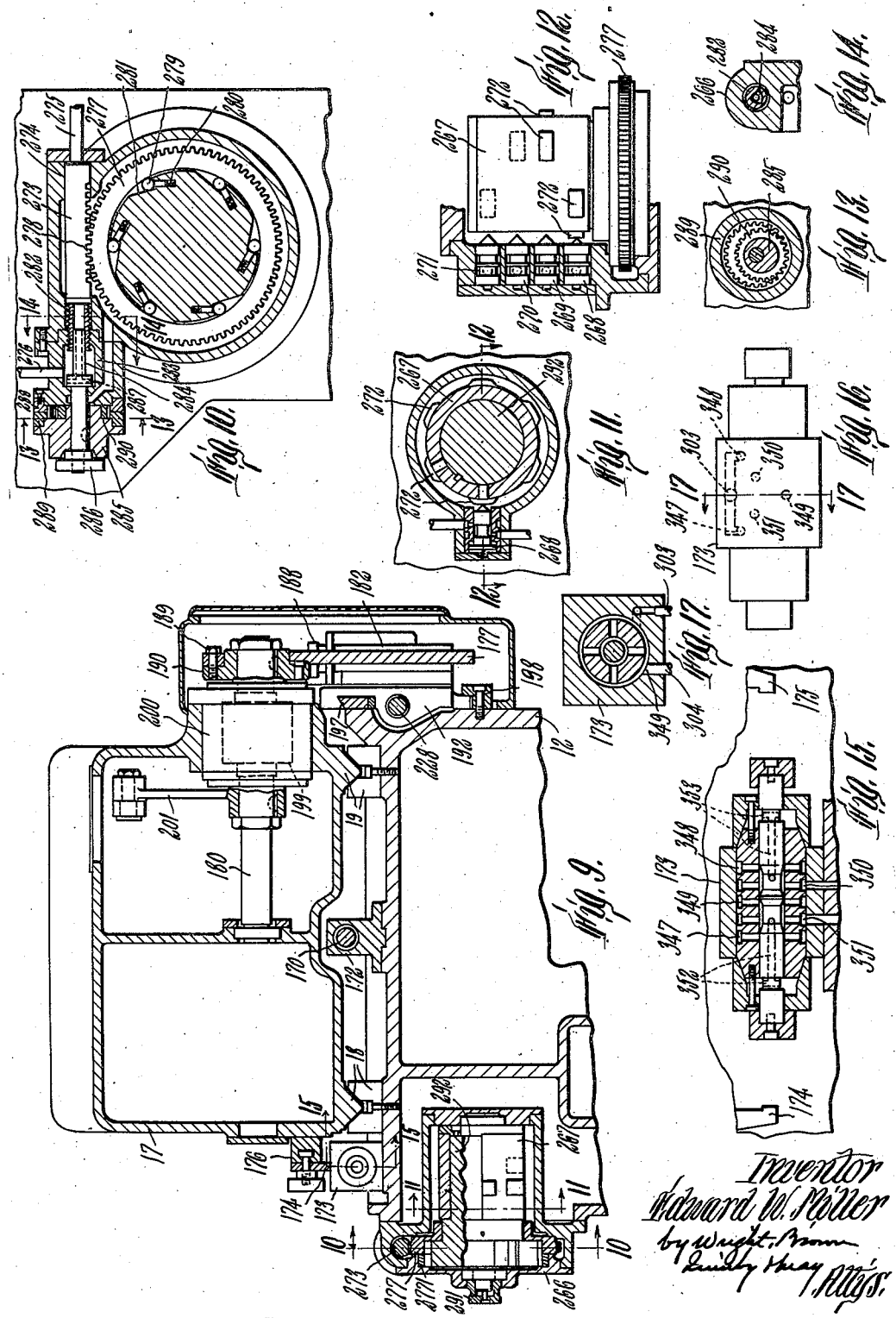

Oct. 16, 1945. E. W. MILLER 2,387,166
AUTOMATIC GEAR GRINDING MACHINE
Filed Aug. 29, 1941 9 Sheets-Sheet 6
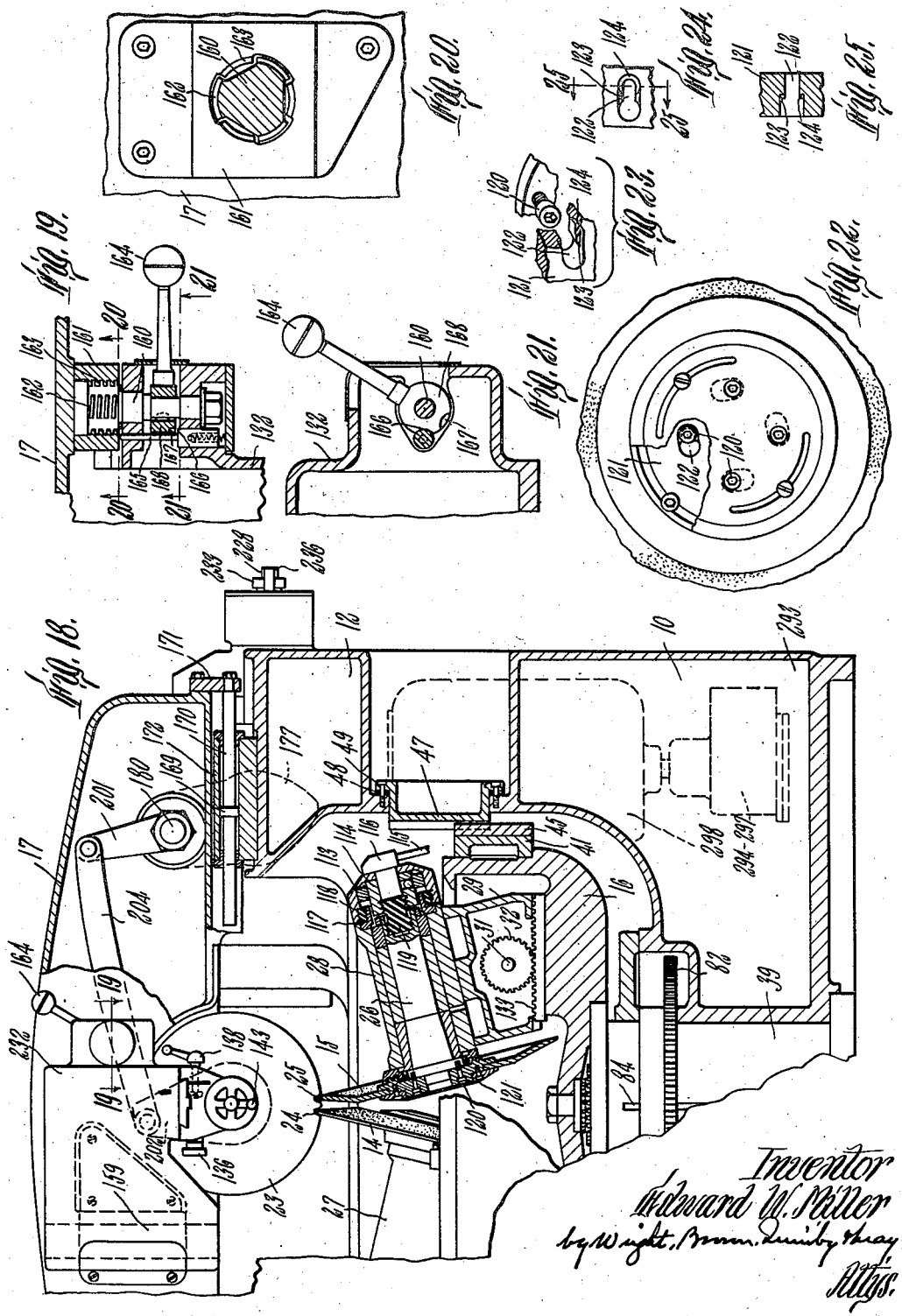

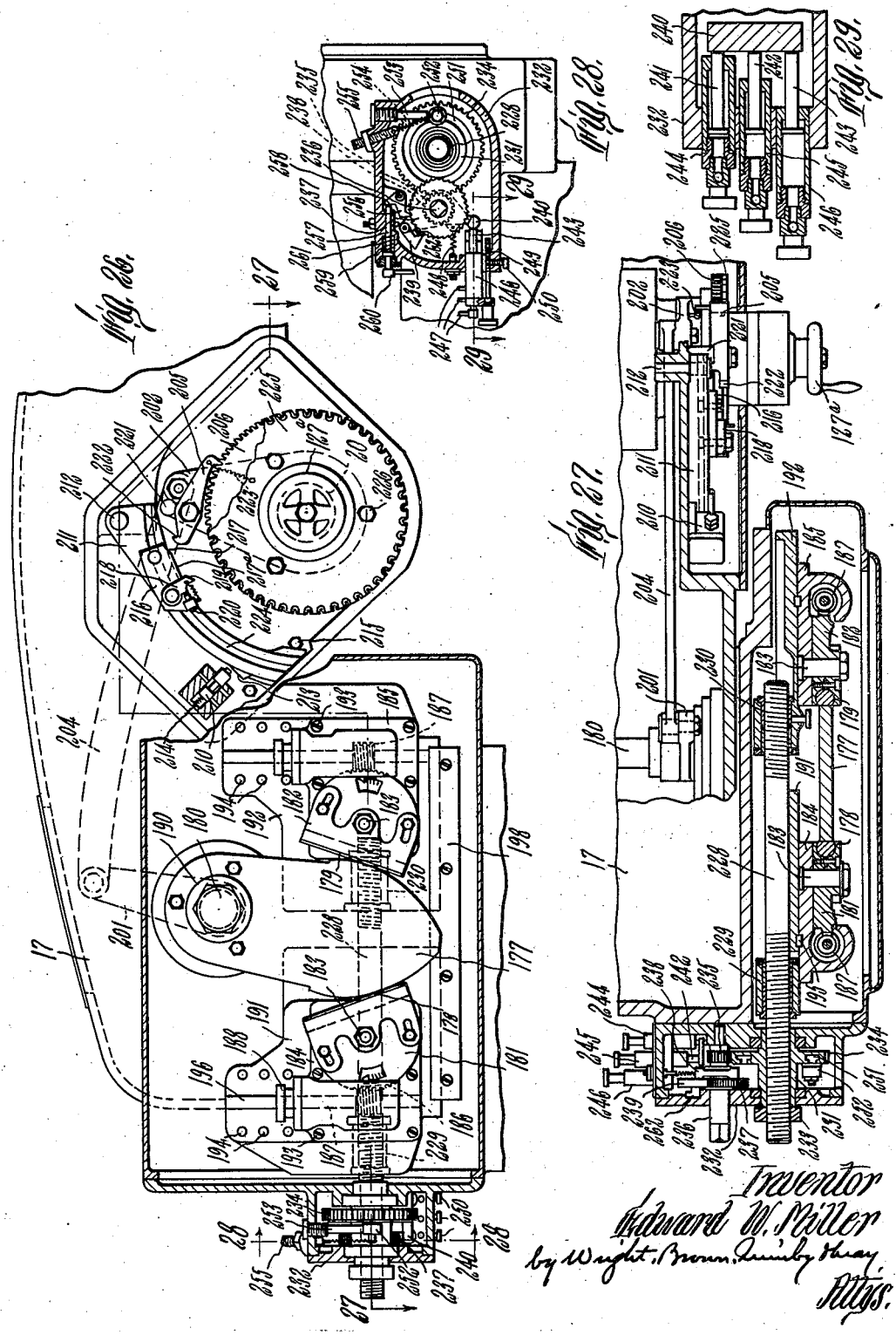

Oct. 16, 1945.  E. W. MILLER  2,387,166
AUTOMATIC GEAR GRINDING MACHINE
Filed Aug. 29, 1941    9 Sheets-Sheet 8
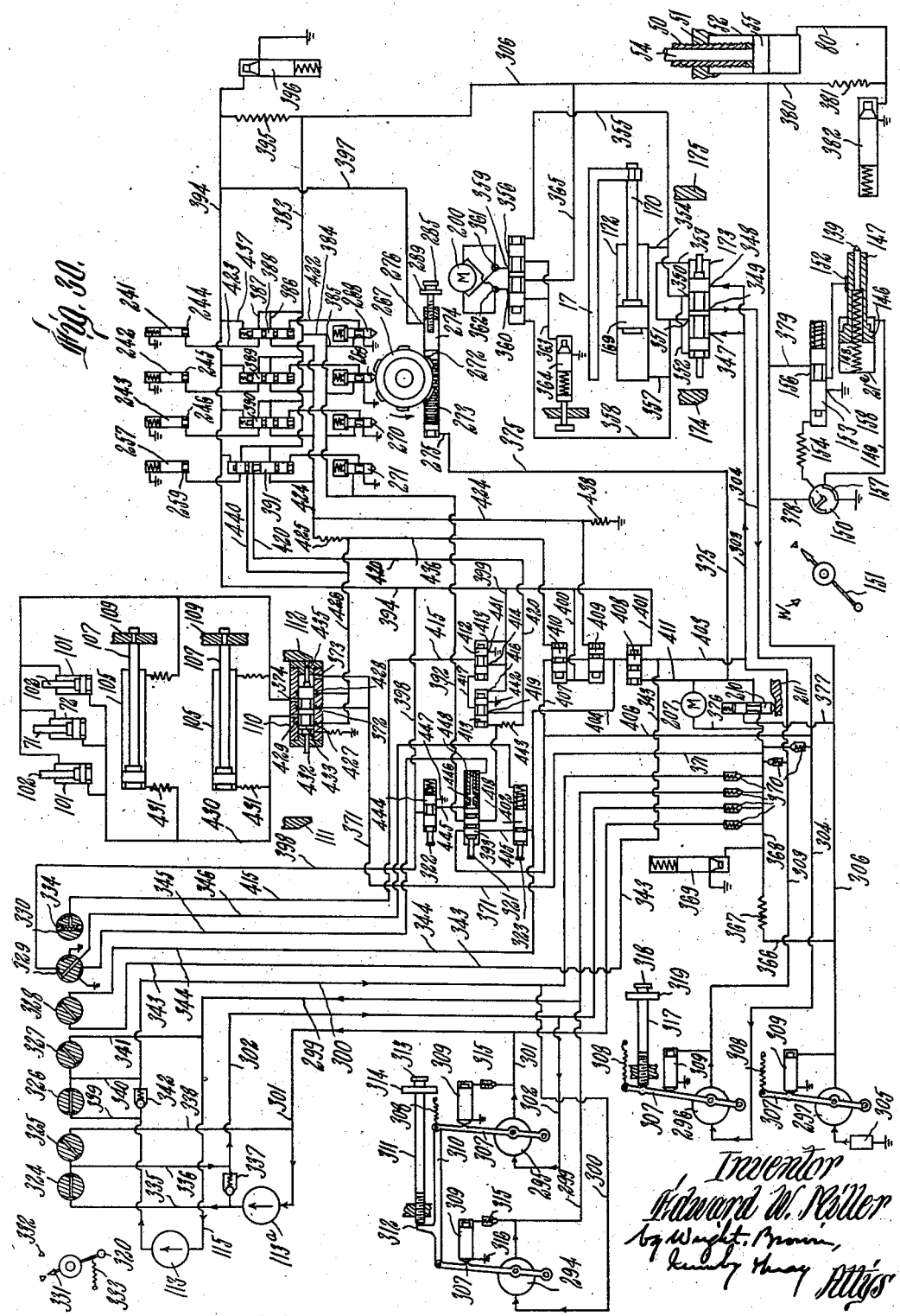

Oct. 16, 1945.  E. W. MILLER  2,387,166
AUTOMATIC GEAR GRINDING MACHINE
Filed Aug. 29, 1941  9 Sheets-Sheet 9
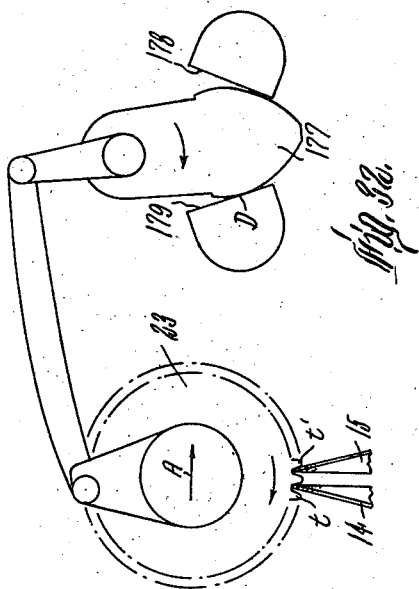
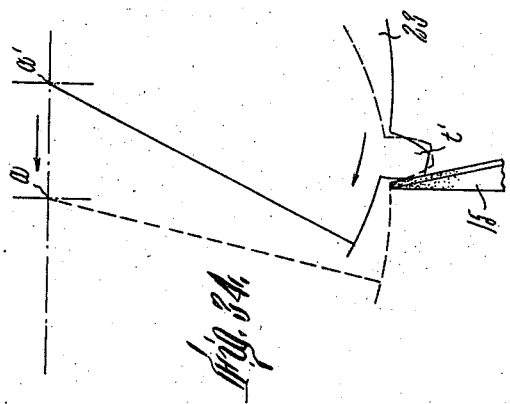
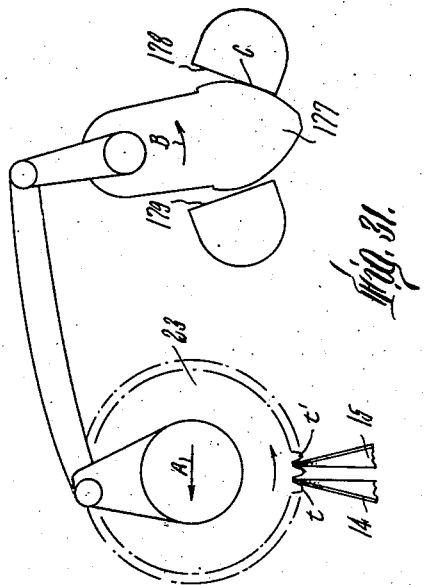
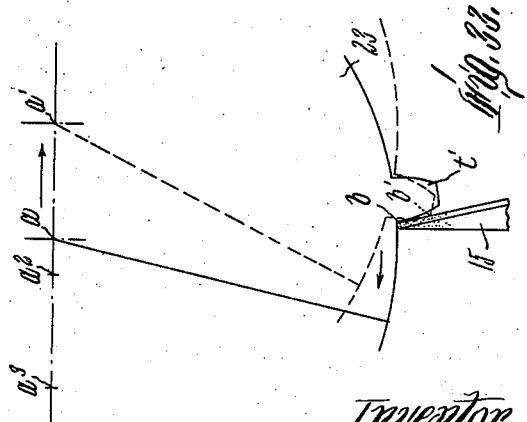
Inventor
Edward W. Miller
by Wright, Brown, Quinby & May
Attys Patented Oct. 16, 1945

2,387,166

UNITED STATES PATENT OFFICE 2,387,166

AUTOMATIC GEAR GRINDING MACHINE

Edward W. Miller, Springfield, Vt., assignor to The Fellows Gear Shaper Company, Springfield, Vt., a corporation of Vermont Application August 29, 1941, Serial No. 408,766

60 Claims. (Cl. 51—123)

The subject matter of this invention relates to machines for cutting and bringing to finished form and dimensions the teeth of gears, gear shaper cutters, and analogous articles so as to generate a prescribed form or contour in the work by relative movement between a work piece and a grinding wheel, or equivalent cutting tool, of which the cutting points lie in a surface of revolution conjugate to the form to be generated. In a more specific aspect, the invention is concerned with the use of two grinding wheels arranged to act on relatively opposite faces of different teeth in repeated alternate succession, and with the production of gears whereof the teeth are uniform in thickness from end to end. In more generic aspects it is applicable to producing gears and gear shaper cutters having longitudinally tapered teeth, and various other elements more or less analogous to gears.

One of the objects of the invention is to provide a completely automatic machine in which the work piece is indexed and repeatedly traversed past the grinding wheel or wheels until all of its teeth have been finished, and in which the grinding wheel faces are maintained true and in their proper cutting locations by automatic adjusting and dressing operations performed at sufficiently frequent intervals. Another object is to separate the means for effecting the rotational component from the means for producing the translational component, of the rolling movement of the work piece, and to permit independent action of one means independently of the other but under unified control. Another object is to provide improved simple and effective means whereby a plurality of successive grinding steps may be performed with provisions for regulating the depth of cutting in each step. Another object is to provide an improved vibrationless drive for the grinding wheel, and in other ways to reduce objectionable vibration to the least possible amount. Numerous other objects are related to the foregoing and will appear from the description which follows of one commercial embodiment of the invention, and from the appended claims.

The embodiment so described, and shown in the drawings, is a hydraulically operated machine in which all of the moving parts involved in the automatic operation of the machine are actuated by hydraulic motive means. In other embodiments, containing substantially the same principles, other motive agents, such as electric motors, solenoids and switches may be used. The invention comprises all novel combinations, sub-combinations and parts exhibited in the said illustrative machine, and also all variations and modifications thereof containing, and operating according to, the same basic principles, within the scope of the appended claims. The more specific features comprised within the invention are fully described and explained in the following specification.

In the drawings,

Fig. 1 is a front elevation of a hydraulically operated gear grinding machine, equipped with two grinding wheels, in which the invention is embodied;

Fig. 2 is a side elevation as seen from the right of Fig. 1;

Fig. 3 is a sectional plan of the parts of the machine cut by, and below, the line 3—3 of Fig. 1;

Fig. 4 is a vertical mid section taken on line 4—4 of Fig. 3;

Fig. 5 is a vertical section on line 5—5 of Fig. 1;

Fig. 6 is a horizontal section on line 6—6 of Fig. 5;

Fig. 7 is a detail vertical section taken on line 7—7 of Fig. 5 and shown on a larger scale; showing the automatic driving means for maintaining the grinding wheels in correct operating position;

Fig. 8 is a much enlarged detail section taken on line 8—8 of Fig. 5;

Fig. 9 is a vertical part section on line 9—9 of Fig. 1;

Figs. 10 and 11 are sectional views of the timing device of the machine taken on lines 10—10 and 11—11 respectively of Fig. 9;

Fig. 12 is a horizontal view of the timing means taken on line 12—12 of Fig. 11;

Figs. 13 and 14 are sectional views on lines 13—13 and 14—14 of Fig. 10, showing details of the adjusting means for controlling the length of the successive steps of the movement of the timer;

Fig. 15 is a longitudinal sectional view of a control valve operated by movements of the work carriage and by which the movements of the carriage motor and other motive agents are controlled, the plane on which this section is taken being indicated by line 15—15 of Fig. 9;

Fig. 16 is a side view of said valve;

Fig. 17 is a cross section of the valve taken on line 17—17 of Fig. 16;

Fig. 18 is a partial front elevation and partial vertical section of the machine through one of the grinding wheel spindles and through the carriage-propelling motor;

Fig. 19 is a detail section taken on line 19—19 of Fig. 18 showing the lock by which the swinging tail stock bracket is secured in work holding position;

Figs. 20 and 21 are cross sections of the lock taken on lines 20—20 and 21—21 of Fig. 19;

Fig. 22 is a face view of the hub of one of the grinding wheels showing the quickly detachable means by which the wheel is secured to its spindle;

Fig. 23 is a fragmentary perspective view of one of the couplings between the spindle and wheel;

Fig. 24 is a face view of the slot member of such coupling;

Fig. 25 is a section on line 25—25 of Fig. 24;

Fig. 26 is a partial rear elevation and part section of the machine showing the means for controlling the rotational component of the work in course of grinding, and the means for indexing the work;

Fig. 27 is a horizontal section of the same means taken on line 27—27 of Fig. 26;

Fig. 28 is a section taken on line 28—28 of Fig. 26 showing the mechanism by which successive steps of feeding the work to the grinding wheels are taken;

Fig. 29 is a horizontal section on line 29—29 of Fig. 28 showing the adjustable feed step controllers;

Fig. 30 is a diagram of the complete control system by which the moving parts of the machine are caused to act in predetermined sequence;

Figs. 31, 32, 33 and 34 are diagrams illustrating some of the different ways in which a work piece may be moved relatively to the grinding wheels.

Like reference characters designate the same parts wherever they occur in all the figures.

In the following description it will be assumed that the work piece shown in the drawings is an involute spur gear, in the understanding that neither this assumption nor the illustration of the machine as hydraulically operated shall be construed as limiting the invention to less than the scope defined by the appended claims with reference to the prior art.

The base 10 of the machine is provided with standards 11, 12, between which is left a space containing two grinding wheels 14, 15, and a stool 16 by which the grinding wheels are supported. A work carriage 17 rests on the upper ends of the standards 11 and 12, bridging across the intermediate space, and is engaged with both standards by means of guideways 18, 19; the guideways of each standard being alined with, or parallel to, those of the other standard.

The carriage thus overlies the grinding wheels; and it is located at a sufficiently high elevation, having regard to the capacity for adjusting the grinding wheels up and down, (later described), to support work pieces of different diameters in operative relation at their under side or limb with the upper edges or limbs of the grinding wheels. A work spindle 20 and a tail stock 21 are mounted on the under part of the carriage between the standards 11 and 12, in axial alinement on a line transverse (preferably perpendicular) to the lines of the guideways, and are adapted to support an arbor or shaft, such as that shown at 22, on which a gear 23 or other suitable work piece is mounted.

For the purpose of generating gears with involute teeth of symmetrical form, the grinding wheels are provided with plane lateral active faces 24 and 25 and rotate about axes perpendicular to their respective faces. They are further arranged with their active faces in planes corresponding to the faces of rack teeth conjugate to the gear to be ground. Such planes are therefore inclined to the path in which the carriage is constrained to move by the guideways 18 and 19 and, when grinding spur gears, they are parallel to the axis of the work piece. It is possible, however, to incline the wheels so that their planes cross such axis at any desired angle, for grinding helical gears, as is more fully set forth in the following description.

In the operation of the machine, the work carriage 17 is reciprocated in the line of the guideways, carrying the work piece back and forth past the grinding wheels, and at the same time the work spindle is rotated at an angular speed in harmony with this translative movement such that the under side of the work gear rolls across the adjacent rims of the grinding wheel in substantially the same manner as though rolling along a stationary rack. In these general respects the machine is substantially like that shown in the patent of E. R. Fellows No. 686,599, granted November 12, 1901, and others, which have long been used for finishing gears, gear shaper cutters and similar articles. It differs from such prior machines in many important respects, hereinafter described.

*Wheel mounting and adjusting means.*—Each wheel is secured to a spindle 26, one of which appears in Fig. 18. These spindles turn in suitable bearings contained in spindle holders or housings 27 and 28 secured to slides 29 which are mounted adjustably on the stool 16. The spindles, slides and associated parts are alike as to both grinding wheels, wherefore it may be understood that the following description of the parts of either wheel assemblage applies equally to both. The slides 29 of the two wheel assemblages are engaged with the stool by means of guides 30 arranged in alinement or parallelism as to the two slides, so that each may be moved toward and away from the other. Each slide supports a shaft 31 on which is a gear 32 meshing with a rack 33, fixed to the stool. Gear 31 is rotated in either direction to shift the slide, as required for grinding gears of different pitches and diameters, by an accessible hand crank 34 on a shaft 35 which is geared to shaft 31 by a gear pair 36, which may be helical gears, or a worm and worm wheel couple. Adjustment of the slides is made secure by tightening the screws which secure the guides 30 in place, causing the latter to serve as clamps, binding the slides against the supporting surface of the stool.

The stool 16 is made as a massive shallow cup having a cylindrical side wall 37 and a bottom 38 on which the wheel carrying slides are mounted in locations such that the wheel axes are in planes radial to the axis of the cylindrical wall 37. A sleeve 39 is secured to the bottom 38 and depends therefrom, having a cylindrical outer surface coaxial with the wall 37 which fits slidingly in a bearing 40 forming part of the base structure. A band 41 surrounds the part 37 of the stool and is divided at one side of the stool at the location 42. The contiguous ends at this location are connected together by bolts 43, which may be turned to tighten or loosen the band about the circumference of the stool. It is to be noted that the band, although made of metal with substantial mass and stiffness, is fitted accurately to the stool and has sufficient elasticity and resilience to release the stool, so that the latter may be rotated, when the bolts are backed off. Wedge keys 44 and 45, extending parallel with the stool axis, are in rigid connection with the band 41 and are confined in complemental keyways in guide members 46 and 47 bolted to the machine base. These keys and guides, with assistance from the sleeve 39 and bearing 40, hold the stool accurately in location, permitting it to be adjusted axially, while preventing any looseness and vibration. The guides 46 and 47 are set to eliminate backlash, without binding, with the aid of suitably thick washers 48 interposed between flanges 49 on the outer ends of the guide members and the adjacent surfaces of the base. When wear occurs, washers of less thickness may be substituted.

Vertical adjustment of the stool, to adapt the grinding wheels to larger or smaller work pieces and to compensate for removal of material from the wheel faces by dressing, is accomplished by a screw 50 coupled with the stool and a complemental nut 51, the latter being formed by internal screw threads in the upper end of a tube 52 which is secured to a plate 53 underlying the end of bearing 40 and secured to the base. The screw 50 and tube 52 are located in the interior space of sleeve 39 and are coaxial with the stool. The coupling between the screw and stool is made by a rod 54, having a head 55 on its lower end, which passes through the entire length of the screw and through the bottom wall 38 of the stool. Anti-friction thrust bearings 56 and 57 are located between the opposite ends of the screw and the head 55 and stool bottom 38 respectively. A nut 58 is screwed on the upper end of rod 54 and bears against the inner surface of the cup bottom, serving to hold the parts together and prevent end play.

A flange 59 on the upper end of screw 50 is made as a face gear, having teeth in mesh with a pinion 60 on a shaft 61, which protrudes from the forward part of the stool and has a squared end 62 adapted to receive a wrench. This provides a manual means for rotating the screw and thereby either raising or lowering the stool.

Shaft 61 is automatically rotated step by step through small increments in one direction in time with other phases of the cycle, when the machine is in operation. For the purpose of so rotating it, a ratchet wheel 63 (Fig. 7), mounted rotatably on the shaft 61, is coupled thereto by a clutch collar 67 splined to the shaft contiguous to the outer end of the ratchet wheel hub, the adjacent faces of the wheel hub and clutch collar having complemental clutch teeth. A nut 68 threaded on the shaft serves to couple the clutch teeth. A spring 69 reacts between the ratchet wheel and clutch collar, serving to move the latter outwardly and disconnect the clutch teeth when the nut 68 is backed off. This nut may be considered as a clutch coupler, movement of which in one direction or the other enables the wheel stool to be moved either manually or by automatic means.

For rotating the ratchet 63 step by step there is provided a drive pawl 70 carried by the extension rod of a piston 71 reciprocably mounted in a hydraulic cylinder 72. A spring pressed plunger 73 is mounted in the piston rod and acts on a shoulder of the pawl to press its toe against the ratchet. A holding pawl 74 is pivoted to a part of the stool and is held against the ratchet by a spring pressed plunger 75 mounted in a stationary socket 76, to prevent backward rotation of the ratchet. A pipe connection 77 is connected with the cylinder 72 at one side of the piston 71 and a pipe 78 is connected with the cylinder at the opposite side of the piston through a passage 79. Working fluid is caused to flow through these connections in opposite directions under automatic control by means later described.

The head 55, previously described, is made as a piston fitting substantially liquid tight the cylinder constituted by the lower part of tube 52. Fluid under pressure is delivered by a pipe 80 and passage 81 in the plate 53 to the cylinder beneath the piston 55. Force is thereby exerted through the screw 50 to counterbalance, wholly or in any desired degree, the weight of the stool and parts supported thereby, thus relieving the screw threads of so much of the weight as is so counterbalanced, and greatly reducing wear on the threads. This is an important feature of the invention.

It has been previously stated that the stool is adjustable angularly to set the grinding wheels in crossed relation to the work spindle axis for grinding helical gears. Such adjustment is accomplished by a worm wheel 82 confined between end thrust bearings in the base, surrounding the sleeve 39 and coupled therewith by a key 83 fitting a longitudinal keyway 84 in the outer side of the sleeve. A worm 85 meshes with worm wheel 82 and is secured to a shaft 86 which turns in bearings in the machine base and protrudes from the forward side of the base. A hand wheel 87 is secured to the protruding end of shaft 86 and has an associated scale 88 whereby the angular setting of the stool may be measured and indicated. Before making an angular adjustment of the stool by this means, the clamping band 41 is loosened, and after the adjustment has been made, the band is tightened, whereby subsequent endwise movements of the stool and grinding wheels are constrained to follow the paths established by the keys 44, 45 and guides 46, 47.

*Wheel dressing.*—In the automatic cycle of this machine, grinding is performed in a series of steps with an automatic feed between each two steps, the wheels are dressed between one grinding action, or series of actions, and the commencement of the next, and the wheels are advanced to compensate for the removal of material in dressing and to place their active faces in the original position. Dressing tools are mounted on the stool contiguous to the grinding wheels and are associated with automatic means for moving them across the active faces of the respective wheels at the proper times in the cycle, and for feeding them relatively to the wheels through distances and in directions so correlated with the advance of the wheels as to maintain the dressed wheel faces in their operative locations. The dressing equipment for both grinding wheels is shown in Fig. 3, and that for one of them in Fig. 1. Each dressing tool is a diamond set in the extremity of a holder 90 carried by an arm 91 which is secured to a spindle rotatably mounted in a bearing 92. The base 93 of the bearing is fitted to slide on a guideway 94 on the top of a standard 95 which rises from the bottom of the stool. The bearing 92 and its base will be hereinafter referred to as the dresser carrier. This standard, the dresser carrier, and arm 91 are appropriately located to cause the diamond, when the arm is oscillated, to travel across the marginal zone of the active face of the adjacent wheel in a path which lies in a plane perpendicular to the wheel axis and preferably is approximately radial to such axis where it crosses the wheel margin. The guideway 94 is inclined to the plane of the active wheel face so that, when the dresser carrier is fed thereon, toward the wheel spindle, the dressing tool is advanced toward the wheel face and enabled to remove stock therefrom. The normal position of the dresser is outside of the periphery of the wheel, and its feeding adjustment, later described, is toward the periphery and active face, enabling it to remove material from those portions of the wheel.

For thus feeding the dresser carrier, a feed screw 96 is mounted in the standard 95 in threaded engagement with a nut 97 depending from the carrier base. A hand crank 98 is secured to, and a ratchet 99 is rotatably mounted on, this screw. A disconnectible clutch 100, which may be substantially like the clutch 67 previously described, and is therefore not shown in detail here, is provided for coupling ratchet 99 to screw 96 when the automatic feed is to be performed. A piston substantially like the piston 71 is mounted reciprocably in a casing 101 and carries a spring pressed pawl 102 in position to drive the ratchet step by step. Connections at 103 and 104 admit working fluid to the upper and under sides of this piston in the same manner as shown in Fig. 7 and are controlled by the control system later described to move the piston up and down at predetermined intervals in the cycle of the machine.

The arm 91 is oscillated by a piston contained in a cylinder 105 of which one end is pivotally connected with an arm 106 which is secured to the same spindle to which arm 91 is secured. The rod 107 of this piston protrudes from the other end of cylinder 105 and is coupled by a pivot 108 with a bracket 109 (Figs. 2 and 5) which extends from the bearing or dresser carrier 92. Working fluid is admitted first to the outer end, and then to the inner end of the cylinder 105, and suitably exhausted, under control of a piston-type reverse valve 110, the casing of which is carried by one of the motor cylinders 105, and its piston is arranged to strike alternately dogs 111 and 112 fixed in stationary locations on the dresser carrier. Working fluid is supplied to it, and exhausted, under control of the automatic timing means and through connections later described. The reversing valve 110 controls both dressers.

In the operation of the machine, while grinding is being performed, the dressers preferably occupy the positions shown in the drawings, outside and clear of the respective wheels. At the times prescribed for dressing the wheels, the dressing tools are passed inwardly across the marginal zones of the wheels, and back to normal position.

*Grinding wheel drive.*—Each wheel spindle 26 is driven by an individual motor, consisting of a housing 113 and a rotor 114 (Fig. 18). The motors here used are driven hydraulically. They are not of my specific invention, and therefore are only conventionally illustrated. They may be fluid turbines or of any other conventional or suitable type, those used in the machine here illustrated being of the constant displacement type. Fluid is conducted to and from the motor through pipes, one of which is shown at 115, and a fitting 116 secured to the end of the housing. A resilient coupling is provided between the motor housing 113 and the spindle housing 28 consisting of a ring 117 of rubber or other suitable cushioning material in the space between a metal annulus 118 and an enveloping part of the motor housing. Such annulus is secured to the end of the spindle housing and protrudes therefrom into the adjacent open end of the motor housing, there being a wide annular space between these parts in which the rubber ring is contained, in pressure engagement with both parts. A resilient coupling 119 connects the rotor 116 and transmits rotation thereto. This coupling also may be made of rubber or other suitable flexible and resilient material having sufficient mass and strength to transmit the power required for driving the wheel at efficient cutting speed. Sufficient clearances are provided between the parts of the motor and the spindle and spindle housing to prevent direct contact, and the resilient couplings insure that whatever vibration is developed in the motor will not be transmitted to the spindle and grinding wheel, while providing a secure mounting for the motor.

Each wheel is secured to its spindle by means constructed to permit quick and easy attachment and detachment of the wheel. Two or more bolts 120 are fitted in tapped holes in the end or nose of the spindle so as to project in the axial direction therefrom, and have heads on their outer ends. The metal hub or central supporting disk 121 of the wheel is provided with a like number of slots 122 curved around the axis of the wheel and spaced conformably to the spacing of the bolts 120. The slots are enough larger at one end than the heads of the bolts with which they coact to permit passage of such heads through them, and have interior ledges 123 at opposite sides extending thence to the opposite end, the distance between the ledges being less than the width of the bolt head but greater than the thickness of the shank. In the end of the slot opposite to that first described, a shallow socket 124, wide enough to receive the bolt head, is sunk into the ledges 123. Thus, when the bolt heads are backed off sufficiently from the spindle nose, the wheel may be placed against the spindle nose, in passing the large ends of the slots over the bolt heads. Then by turning the wheel about its axis, the ledges are brought under, and the sockets 124 into line with, the bolt heads, and the latter may be screwed inward to enter the sockets and clamp the wheel hub firmly against the spindle. It may be noted that the bolts are formed with non-circular sockets to receive a complemental wrench rod, whereby the bolts may be set up and backed off, though their heads do not protrude beyond the outer face of the wheel hub.

*Work holding means.*—The work spindle 20, which is supported by the work carriage 17 in a manner later described, contains, in splined connection with it, an internal sleeve 125, to the outer or rear end of which is connected a nut 126 meshing with an adjusting screw 127 having an operating hand wheel 127a. The inner or forward end carries a spring pressed center 128. The sleeve is further provided with means to transmit rotation to the work arbor 22, comprising a transverse flat bar key 129 overlapping a flat chordal surface on the adjacent end of the arbor, and a wedge key 130 (Fig. 8) projecting into a complemental notch in the end of the arbor. A shelf 131 is secured to a part of the carriage structure and protrudes forwardly beyond the spindle in position to assist in supporting the work arbor when the latter is brought into the above described engagement with the spindle in the course of mounting the work.

The tail stock 21 is suspended from a bracket 132, here referred to as the tail stock bracket, and is slidingly engaged with a guideway 133 (Fig. 1). It carries a pinion 134 meshing with a rack 135 on the bracket, and connected with a knob 136 whereby the tail stock may be adjusted bodily toward and away from the work spindle. The base portion of the tail stock is split to form a spring jaw 137 which may be set up against the guideway by a screw 138 to secure such adjustments. A tail center 139 is mounted in a sleeve 140 which slides in splined engagement within the tail stock and contains a splined slidable nut 141. This nut is engaged with an adjusting screw 142, supported rotatably by the tail stock and carrying a hand crank 143. A spring 144 between the nut 141 and an internal shoulder 145 in sleeve 140 affords capacity for yielding of the center relative to the nut.

Hydraulic means for advancing and retracting the tail center may be used in place of the screw and nut combination just described. In Fig. 30 an alternative hydraulic means for this purpose is shown diagrammatically in connection with a diagram of the entire operating and control system. It consists of a cylinder 21a, corresponding to the tail stock 21, which is mounted on the bracket 132, in substantially the same way as described and in which is contained a piston 146 having an extension 147 in which the center 139 is mounted. A spring 148 is arranged to exert force on the piston and its extension toward the head stock; and a pipe line 149 is connected with the cylinder at the side of the piston toward the head stock, whereby fluid from a pressure source may be applied to withdraw the center. Admission and release of the pressure fluid is controlled by a valve 150 having an operating handle 151. When the pressure is released, spring 148 advances the piston and forces the fluid out of the cylinder space in front of the piston.

A clamp 152, also hydraulically operated, is arranged to bear on one side of the extension 147 to secure the center in its advanced, or work engaging, position. Pressure fluid is admitted to and released from the clamp by an automatic valve 153 controlled by the manual valve 150. The means for transmitting fluid pressure to the clamp 152 may be a cylinder and piston combination similar to others described in this specification, an expansible bellows of known character, a flexible diaphragm, etc.

With the control handle in the position shown, connection is made from the supply source through valve 150 and a reducing connection 154 with one end of the casing of valve 153, moving the slide or piston member thereof against a spring 155 and connecting the pressure supply with the clamp actuator through a space 156 provided in the valve member. The pipe 149 is then connected with an exhaust outlet through a space 157 in valve 150, and when the handle is turned to the position for withdrawal, marked "W," the pipe 149 is connected with the pressure source; the connection 154 is connected with the exhaust port of valve 150, and the valve 153 is shifted by spring 155 to connect the clamp actuator with the exhaust port 158 of the latter valve.

The tail stock bracket 132 is adapted to be swung aside and leave an open space which facilitates mounting of the work. This is desirable on occasions, although not always necessary. It is connected with the carriage by an upright pivot rod 159 shown dotted in Figs. 1 and 18, and it carries a rotatably mounted locking bolt 160, one end of which protrudes from its bearings and is adapted to enter a socket 161 attached to the carriage, (Figs. 19, 20 and 21). The protruding end of the bolt and the socket have complemental interrupted screw threads 162 and 163, of which the sectors on each part are narrower than the interruptions of the threads in the other part, so that they may be interlocked and disengaged by a partial rotation of the bolt when the protruding end is fully entered into the socket. A handle 164 is secured to the bolt for so locking it. The unlocked position is shown in Figs. 19 and 20, and the locked position in Fig. 21. A spring pressed pin 165 having a shoulder 166 serves as a latch to hold the bolt in its unlocked position so that it may enter the socket without danger of interference between the complemental thread segments. It performs this function by entrance of the shoulder 166 into a shallow socket 167 in the contiguous part of the handle hub 168. This latch pin is mounted beside the bolt to slide endwise parallel thereto and one end protrudes in position to bear against the outer face of the socket member 161 before the bolt is fully entered thereinto; and its protruding length is such that it is pushed back far enough to withdraw the latch shoulder 166 from the recess 167 when the bracket is in the position for locking. At the commencement of swinging aside movement of the tail stock bracket, the latch shoulder is advanced by its spring into the recess 167.

This combination of swinging tail stock bracket and spring advanced tail center enables the work to be quickly mounted and engaged with the correct pressure by the center, without need of making a separate adjustment of the center for each piece. When the hydraulic tail stock is used in this combination, the pipes leading to it include flexible sections.

*Work rolling means.*—The translative component of the rolling movement of the work past the grinding wheels is obtained by reciprocation of the carriage effected by a motor which performs only that function. Such motor consists of a piston 169 (Fig. 18) forming part of a rod 170, one end of which is connected to the slide by a bracket 171. This rod is parallel to the path of movement of the carriage and passes through a cylinder 172, mounted on the base upright 12, in which the piston 169 fits slidingly. Reversal of the slide is effected by fluid admitted to opposite ends of cylinder 172 by a reversing valve 173 (Fig. 1) containing an internal sliding piston, of which the opposite ends protrude from the casing to be engaged by dogs 174 and 175 mounted on the carriage. These dogs are mounted in a guideway 176, extending lengthwise of the carriage travel, along which they are adjustable independently of each other to regulate the length and position of the carriage strokes.

The rotative component of its rolling movement is imparted to the work by a motor, later described, and is controlled by a machine element 177 (Fig. 26) in the nature of a cam, which is commonly called a former, in cooperation with abutments 178 and 179. The former has a portion which extends between the abutments and has opposite side faces corresponding to the faces of a gear tooth many times larger than the teeth of the gear to be finished. It is secured to a shaft 180 (Figs. 9 and 18) rotatably mounted on the carriage at one side of, and preferably parallel to the work spindle 20. The abutments embrace the former as two rack teeth embrace a conjugate gear tooth, and are mounted on the stationary base, being located in the plane in which the former swings. That plane, being perpendicular to the shaft 180, is substantially parallel to the path of the carriage 17. Preferably the engaging parts of the abutments are cylindrical bars flattened at one side, and clamped in the edges of segmental holder plates 181, 182, which are connected by pivots 183 with base plates 184 and 185. The holder plates are adjustable angularly about the pivots 183 in order to change the inclination of the abutment faces and thus enable the work piece teeth to be ground with different characteristics without changing the former. For so adjusting them, their curved faces are provided with a series of gear teeth 186 and are meshed with worms 187 mounted rotatably in the respective base plates on shafts 187 to which adjusting knobs 188 are secured.

For grinding different pieces outside of the range accommodated by adjustment of the abutments, different formers are substituted for the one shown here. The former is secured by bolts 189 to a collar 190 secured to the outer end of shaft 180, whereby such substitutions are readily made. The base plates 184 and 185 are secured to abutment carriers or slides 191 and 192 by bolts 193, which may be set into different ones of a series of holes 194 in said carriers, whereby to adjust the abutments to formers which project more or less from the shaft 180. Keys 195 entering keyways 196 in the former carriers locate the base plates accurately. The abutment carriers are supported by guides 197, 198 on the back of the base upright 12 which extend lengthwise of the work carriage travel, and are adjustable along said guides to accommodate different formers and effect a feeding advance of the work. The work feeding feature will be later described.

A motor 199 is mounted on shaft 180 for applying torque to the shaft and force to the former alternately in opposite directions in time with the reciprocations of the carriage 17. Any one of a number of reversible rotary hydraulic motors may be used here. A simple form of paddle motor, having a blade or blades acting between abutments in a housing 200, which is secured to the carriage structure, is used here for convenience. Other types of motor may equally well be used. Such motors are so well known to those skilled in the art that detailed illustration of one is deemed unnecessary. It is to be understood of course that the motor housing has suitably disposed ports for admission and exhaust of the working fluid.

Oscillations of the former are transmitted to the work spindle by means of an arm 201 keyed to shaft 180, an arm 202 which has a rotative bearing at 203 (Fig. 5) on the work spindle 20, a link or connecting rod 204 pivoted to the arms 201 and 202, a pawl 205 (Fig. 26) carried by arm 202, and an index wheel 206 secured to the work spindle. The length of the link 204 between its centers of pivotal connection with the arms 201 and 202 is equal to the distance between the axes of work spindle 20 and shaft 180, and these two arms are of equal length from their respective axes to the centers of their connections with the link. Thus the angular movements of the former are transmitted equally to the work spindle. The lateral displacement of the former axis from the work spindle axis here described is a desirable feature for convenience of design and manufacture, but is not fundamentally essential. That is, other designs containing the same principles, but in which the former and work spindle are axially alined are within the scope of this invention.

Fluid is admitted to the opposite sides of the carriage motor and former motor under unified control to cause simultaneous action of both, and reversals of both at the same or nearly the same instants. Thus translation and rotation are transmitted to the work simultaneously, causing the work to roll across the adjacent rims of the grinding wheels in the manner of a gear rolling on a stationary rack.

The provision of separate motors for the carriage and former enables the former to be applied against either abutment while the carriage travels in either direction according as torque is applied to the former in one direction or the other during the traverses of the carriage. It also relieves the former of the burden of shifting the carriage, thus enabling a motor of small power to be used with the former and making the pressure and wear between the former and abutments a bare minimum. Only such pressure is needed between these parts as will cause the work spindle to turn at the proper speed, in harmony with its translative movement, to generate the prescribed curves on its tooth faces. It further enables feeding of the work, to bring the teeth to final dimensions by a succession of cuts, to be performed in an improved way, which is later described.

*Work indexing.*—Each pass back and forth of the carriage causes one tooth face of the work to be ground by the wheel 14 and another tooth face to be ground by the wheel 15. At the end of each return passage, the work is indexed to bring other teeth into position for grinding. This is accomplished by releasing the pawl 205 from the index wheel 206 and giving an increment of rotation to the work spindle by means of an index motor 207. This motor is a hydraulic rotary motor of which the housing is made fast to the work carriage 17 and the rotor is secured to the work spindle 20, which latter turns in bearings 208 and 209. Any one of several known types of hydraulic rotary motor may be used here, wherefore it is deemed unnecessary to show the details of such a motor. Normally the admission and exhaust sides of the motor are under equal fluid pressures of low intensity. The admission of fluid at operating pressure is controlled by a valve 210 which normally excludes the operating pressure and is opened to admit that pressure simultaneously with the disengagement of the spindle driving pawl 205 from the index disk. A device for performing these actions is shown in Fig. 26. It consists of an arm 211 connected by a pivot 212 with a part of the carriage structure and having a shoulder 213 engaging the stem of valve 210 and adapted to shift such valve against the resistance of a spring 214 into the pressure admitting position. The arm normally bears against a fixed stop 215. It supports a holder 216 having a cam surface 217 and a contiguous supporting surface 217a, and to which is pivoted a dog 218 having also a cam surface 219. The dog is held by a spring as shown, against an adjustable stop 220, so that it cannot swing to the left from the position shown, but may swing to the right. The arm 202 carries a displacer 221 adapted to pass under and engage the cam surface 217 when arm 202 swings to the left from the position shown, and thereby displace arm 211. The pawl 205 has a contact part 222 arranged to engage the face 219 of the dog at or near the time when the displacer 221 so moves the arm 211. These several parts are relatively arranged and made of suitable dimensions to cause displacement of the pawl from the embracing notch of the index disk against the pull of a spring 223, and hold it so displaced until the index motor has started. Continuing movement of arm 202 carries the contact part 222 past the dog and allows the pawl to reengage the disk before the index motor has turned the spindle through more than the prescribed distance. When the next open notch of the index plate reaches the pawl, the latter enters it and restores the driving connection. On the next following swing of arms 202 to the right, the pawl contact part 222 displaces the dog 218 in passing.

The holder 216 is adjustable along the arm 211 to accommodate the differences of angular movement needed to grind gears with larger or smaller spacings of teeth, and is set where its cam surface 217 will be engaged by displacer 221 before arm 202 reaches the end of its swing, and its supporting surface 217a will rest on the displacer throughout the balance of such swing. It is mounted by means of bolts having heads which occupy an undercut slot 224 in the arm. This groove is nearly but not exactly concentric with the work spindle axis. Its eccentricity is such that its end remote from the pivot 212 is nearer to the spindle axis than is the opposite end, when the arm rests against stop 215, and in a measure such that the displacement of the valve will be substantially the same whether the cam surface 217 is located near or remote from the pivot. In other words, the eccentricity is added to the cam lift in displacing the arm, when the cam is located remote from the pivot, thus compensating for the increased movement due to leverage given to the shoulder 213 when the cam is nearer to the pivot.

The length of the indexing steps is accommodated to gears of different numbers of teeth and different diameters by the combination of an obstruction disk 225 with the index disk 206, and by the substitution of different disks on the spindle. The obstruction disk has a less number of notches than the index disk, equally distributed around its circumference, and placed to register with non consecutive notches of the index disk. Its sectors extend across the intermediate notches of the index disk and prevent entrance of the pawl into such notches. There may be one half, one third or any other fractional part of the number of index disk notches in the obstruction disk. These disks are detachably secured by bolts 226 to a flange 227 which has a hub keyed to the work spindle, as shown in Fig. 5.

*Work feeding.*—The grinding is performed in a succession of steps, and the work is incrementally turned through a small angle after completion of each step to cause further cutting to greater depth into the substance of the teeth. There may be any number of such steps of equal or different lengths. The present illustration contemplates six such steps, of which the first three are roughing cuts of considerable depth, the next two are semifinishing cuts of less depth, and the final step is a very light finishing cut. These steps of depth feeding are accomplished by moving the abutments 178 and 179 away from the former, whereby further approach of the work gear teeth to the grinding wheels is permitted. The abutment carriers 191 and 192 are engaged with a lead screw 228 by means of nuts 229 and 230 having right hand and left hand threads, respectively. A sleeve 231 is screwed on the end of the lead screw in a housing 232 and is clamped by a lock nut 233 so that it cannot rotate independently when set up for operation. A gear 234 surrounds the sleeve 231 in non-rotative union therewith and meshes with a pinion 235 on a shaft 236. The latter shaft also carries in rigid connection a ratchet wheel 237 and supports rotatably a pawl carrying lever 238 on one arm of which is pivoted a pawl 239 in position to engage with the ratchet. The pawl carrier has a second arm to which is secured an abutment bar 240, such bar extending to both sides of the lever so as to afford engaging points for a number of actuators.

Three such actuators are shown in Fig. 29, designated 241, 242 and 243. They are the extension rods of pistons which fit in cylinders 244, 245 and 246 mounted in one wall of the housing 232. Working fluid under pressure, admitted through connections in the outer ends of these cylinders, shown at 247 in Fig. 28, causing the piston rods to be advanced so as to turn the ratchet. A spring 248 holds the abutment bar against the piston rods and returns the pawl 239 to starting position after having been advanced by one or another of the pistons.

The cylinders last described are adjustable in and out so as to regulate the length of stroke imparted to the pawl. The maximum stroke is of course the full interior length of the cylinder; and this may be shortened to any amount by withdrawing the cylinders. In the arrangement shown, the piston rod 241 is adapted to make approximately the maximum stroke; the piston 243 a very short stroke, and the piston 242 a stroke of intermediate length. A screw 249 is coupled with each cylinder and threaded into the housing for making these adjustments. It is made fast by a set screw 250.

An undercut annular slot 251 is made in the side of the gear 234 in which is clamped a stud 252. A stop pin 253 is mounted in the housing with its end in the path of this stud, and a spring 254 connected to the stud and to an anchor screw 255 tends to hold the stud against the stop pin and to return it thereto after separation. The stud and stop cooperate in establishing a starting point for the depth feed, which can be varied by adjustment of the stud in the slot 251.

A holding pawl 256 is pivoted to a bracket in the housing 232, engaging the ratchet 237 to prevent backward movement of the latter between steps of the feed. It is either gravity actuated or spring actuated to engage the ratchet, but may be disengaged by a fluid actuated plunger 257 which acts against a shoulder 258 on this pawl and has a piston fitting in a chamber 259. Pressure fluid admitted to this chamber at the outer end of the piston through a connection 260 serves to disengage the pawl. A spring 261 normally urges the piston to inactive position. A shield 262 is located to lie between the ratchet and the toe of pawl 239 when the pawl carrier is at the limit of movement shown in these drawings.

In the operation of this mechanism, starting with the abutments 178 and 179 at a minimum distance apart, the work is rolled and indexed repeatedly until all of the teeth have been ground. One of the feed plungers, as that designated 241, is then actuated to move the pawl 239 and give a step of rotation to the lead screw 228, the length of which is determined by the adjusted position of the cylinder 244. Thereafter, following further grindings of all the teeth, this plunger, and the plungers 242 and 243 are successively actuated one or more times, giving further increments of rotation to the lead screw and moving the abutments further apart by successive steps, until the cycle is finished. Then pressure is admitted to the cylinder 259 to disengage the holding pawl 256, and the gear 234 is reversely rotated by spring 254, until arrested by stud 252 bringing up against stop pin 253. This returns the abutments 178 and 179 to their original position. Shield 262, by holding pawl 239 out of engagement with ratchet 237, permits the latter to turn reversely under the driving effect of gear 234.

The effects of the separation of the abutments and of the oscillations of the former are shown in Figs. 31 and 32. In these figures the point of view is the same as that in Figs. 1 and 18. In Fig. 31 it is assumed that the work carriage 17 is traveling from right to left, as indicated by the arrow A, and that the former is being turned counterclockwise, as indicated by the arrow B. The former then makes contact with the abutment 178, as at C. Rotation of the former is transmitted to the work spindle, and the tooth $t$ of the work thereby brought into contact with the grinding wheel 14, and is rolled on said face as on a rack tooth; the work gear tooth $t'$ being withdrawn from the grinding wheel 15. On reversal of the carriage and former, the condition shown in Fig. 32 occurs, where the former is brought into contact at D with the abutment 179 and the work gear tooth $t'$ brought into engagement with grinding wheel 15. Movement of the carriage to the right, with continued clockwise rotation of the former, causes tooth $t'$ to be ground. After, and due to, each increment of withdrawal of the abutments, an increment of angular movement is given to the former and work, additional to that due to the rolling engagement of the former with the abutments, whereby more stock is removed from the gear teeth. This manner of feeding is made possible by the independent former-actuating motor.

With the relationship of translation and rotation as indicated by the arrows in Figs. 31 and 32, the progress of the grinding action is from root to tip of each gear tooth. This fact is further illustrated by Fig. 33, which shows the progress of the work in grinding the tooth $t'$. At the start of the grinding action, the center of the work piece is in the position $a$ and the grinding wheel is in contact with the root of tooth $t'$ at the point $b$. At the conclusion of grinding, the work center has traveled to the point $a'$ while the work piece has turned in clockwise rotation, and the tooth has been brought to the dotted line position, with its extremity in contact with the wheel at $b'$.

Exactly the same action in reversed order is performed on the tooth $t$ by the grinding wheel 14, while the work center travels from approximately the point $a^2$ to approximately the point $a^3$, and the work is turned in counter-clockwise rotation.

The same combination alternatively enables the teeth to be ground from tip to root. This is accomplished by applying clockwise torque to the former and work while the carriage travels from right to left, as indicated by the arrows in Fig. 34; and by applying counter-clockwise torque when the carriage travels from left to right. Reversible fluid connections to the former-impelling motor 206 enable the direction of torque to be reversed independently of the direction of carriage travel. Although in the latter case the former works in opposition to the carriage, its resistance is negligible because its impelling motor is of small power as compared with the carriage propelling motor. In either case the only work required of the former-impelling motor is to maintain engagement of the former with one or the other abutment continuously throughout the travel of the carriage in one direction or the other.

To permit unimpeded rotation of the indexing motor 207 with the work spindle while the work is thus rolled back and forth, the intake and exhaust ports of that motor are connected in a short circuit, in which the index valve 210 is interposed, and which is continuously open except when said valve is operated to cause indexing.

*Timing means.*—This machine is designed to grind the teeth of a work gear successively until all, or a predetermined number, have been ground; then to dress the wheels and adjust them so that the dressed faces are in correct operating position, shift the abutments 178 and 179 to provide an increment of work feeding; repeat this series of actions until a prescribed number of grinding steps have been completed, and finally stop the machine. These actions are performed by the elements and mechanisms previously described, under control of a timing mechanism. One embodiment of such timing mechanism is shown in Figs. 9–12 and is as follows. A housing 266 mounted on any convenient part of the machine frame contains a timing drum 267 and a set of valves 268, 269, 270 and 271. These valves are arranged preferably side by side in a row parallel to the axis of the drum and have internal plungers movable toward and away from the adjacent side of the drum. The plungers are held by springs in locations where their contiguous ends may be engaged by cam members 272 on the drum, as the latter rotates; and are adapted to be moved outwardly by such cam members. The valves 268, 269 and 270 control the feed plungers 241, 242 and 243, respectively, and the valve 271 controls plunger 257, all through the agency of intermediate shuttle valves later described.

The cam members 272 are mounted on the drum in zones alined with the respective valves; and there are as many of them in each zone as the number of operations in the machine cycle controlled by the respective valves. Thus, for example, if two feeding steps are to be caused by the plunger 241 under control of valve 268, there will be two cam members in the zone alined with that valve; and other cam members in the zones alined with valves 269 and 270 according to the number of feeding steps to be performed by the plungers 242 and 243, respectively. There is only one cam member in the zone alined with valve 271, for actuation of this valve stops the machine. The angular spacing of the cam members around the axis of the timing drum is determined by the angle through which the drum is rotated while a given number of teeth are being ground. Hence when all the teeth of a complete gear are to be ground between successive feeding steps, the angular spacing between successive cam members are equal fractions of 360°.

Step by step rotation of the timing drum is effected by a plunger 273 fitted to a cylinder 274, to one end of which working pressure is supplied through a pipe 275 and to the other end of which a constant back pressure is supplied through a pipe 276. Plunger 273 is arranged tangent to a ring gear 277, fitted rotatably on the timing drum, and has rack teeth 278 meshing with the teeth of said gear. This gear is coupled to the drum by a one way friction clutch, preferably one of the wedging ball type having rollers or balls 279 which are forced by springs 280 toward the narrow end of the spaces between the inner circumference of the ring gear and inclined surfaces 281 in the zone of the drum encircled thereby. A similar clutch including a stationary ring 2771 fixed in the housing 266, and oppositely disposed rolls and wedge surfaces, is provided to prevent reverse movement of the drum. Friction clutches are used here, rather than clutches of ratchet type, in order to enable any degree of rotation to be imparted to the drum between zero and the maximum travel of the plunger.

The plunger stroke is limited by a screw stop 282 threaded through the cylinder head 283 at the opposite end thereof from that to which high pressure fluid is admitted. The screw stop is in sliding splined connection with an operating shaft 284 projecting out of the cylinder head 283, and on which an operating knob 285 is secured by a key and a lock nut 286. Back pressure fluid admitted to a chamber in the cylinder head by pipe 276 passes through passageways 287 in the operating shaft and the interior of stop screw 282 to the plunger.

This adjusting means provides a minute regulation of the travel of the plunger. The screw is set in accordance with the number of teeth of the gear being ground so that the corresponding number of plunger reciprocation will turn the timing drum through the angle between corresponding points of successive cam projections 272. Adjustments are indicated and measured by a differential indicator consisting of an internal gear 288 secured to the cylinder head 283, a contiguous internal gear 289 having one, or a few, teeth more or less than the gear 288, and a pinion 290 mounted eccentrically on the knob 285 in mesh with both internal gears, (see also Fig. 13). The gear 289 bears index markings or a scale on its external surface. A knob 291 (Fig. 9, also Fig. 1) secured to the timing drum and projecting through the housing 266 carries a scale which shows, by reference to a stationary index, the angular position of the drum.

As a convenient detail of manufacture, that part of the drum 267 which carries the cam members, is made as a sleeve detachably mounted and keyed on a body 292, and the cam members are detachably secured in such sleeve. Substitution of a wide variety of different timing cam combinations is thus made possible.

*Hydraulic system.*—A supply of working fluid, preferably oil, is provided in a tank or chamber 293 (Figs. 3 and 18) in the machine base and is transmitted under pressure to the various motors, etc. by a battery or group of pumps, shown collectively in Fig. 18, and designated 294–297, driven by an electric motor 298. The several pumps, the motors, etc. previously described, and associated control means and connections, are shown diagrammatically, in operative association, in Fig. 30. One of the pumps, as 294, drives the motor 113 of one of the grinding wheel spindles through supply and return connections 299 and 300, respectively. A second pump, as 295, drives the motor 113a of the other grinding wheel spindle through supply and return lines 301, 302. The third pump, 296, has supply and return connections 303, 304 with the valve 173 which controls the work carriage 17. The fourth pump, 297, takes oil from the tank through a filter 305 and is used to provide hydraulic flow through a line 306 for actuating the various control elements, and also to make up leakage in the circuits of the other three pumps. It may be conveniently designated as the accumulator pump.

All of the pumps are variable delivery pumps of known character, having means, here represented as a lever 307, for changing their rate of delivery. Springs 308 tend to move the control levers to the position of maximum delivery, and pistons 309 are arranged in cylinders connected with the discharge connections of the pumps for shifting the control levers to the minimum delivery position if the outflow pressure mounts sufficiently to overcome the springs and check valves 315.

The controllers of the pumps 294 and 295, which supply the wheel driving motors are connected for unitary action, the connection being represented by link 310, and the speed of the pumps is regulated by an adjustable stop screw 311, against which a lug 312 on the link abuts at a point short of the maximum delivery position. This stop screw is adjusted by a knob 313 having an index adjacent to a dial 314 which is calibrated to read in terms of grinding wheel speeds. When the grinding wheel spindles are started from rest, high pressure is needed to overcome their inertia and other resistance. Such pressure causes the delivery controllers to be shifted toward the minimum displacement position, substantially relieving the load on the electric driving motor 298. Then as the spindles gain momentum, the pressure diminishes enabling the controllers to be moved so as to increase the pump delivery until arrested by the stop 311. A too rapid acceleration is prevented by check valves 315 in the supply lines to the pistons 309, and the rate of acceleration is controlled by a slow leakage past the pistons. The fluid thus leaking by returns to the tank as indicated by the symbol 316. Similar symbols found elsewhere in this diagram also indicate discharge to the tank, except in the case of that adjacent to the filter 305, which designates an intake connection.

A single control lever, or the like, may be organized to control both pumps 294 and 295; the duplication of such levers in the diagram being a graphic illustration of the fact that both pumps are so controlled.

The speed of the work carriage 17 is similarly regulated by a stop screw 317 in conjunction with the control lever 307 of pump 296; this stop screw being adjusted by a knob 318 having an index cooperating with a scale 319.

When the machine is in operation, the pump-driving electric motor and pumps are running continuously. The running of the grinding wheels is controlled by a handle 320 and the operation of the work carriage and other instruments of the machine is controlled by a start push button 321, a stop push button 322 and a jog push button 323. Interlocks are provided which prevent manual shifting of the start button except when the grinding wheels are running, and prevent such shifting of the jog button except when the wheels are stationary.

The handle 320 is connected to a group of rotary valves or cocks 324, 325, 326, 327, 328, 329, and a lock 330. These last named units may be parts of a single valve body mounted in a single casing and having suitably disposed ports and passages, or they may be separate structural units connected for simultaneous movement. In the diagram they are shown as separated, for convenience of illustration. The handle and associated valves may be placed in two positions, one of which, called the "run" position, is shown in the diagram, and the other, called the "off" position, is taken when the pointer 331 connected to the handle is moved to the point 332. A spring indicated at 333, tends constantly to shift the valve to the "off" position, but is prevented from doing so when the machine is running by the lock 330. Such lock carries ball detents 334 which are held by fluid pressure in recesses in the surrounding casing, with a force greater than can be overcome by the spring, but are rendered inoperative for that purpose when the fluid pressure is released. The valve units or sections 324 and 325 control the running of the wheel spindle motor 113a. The part 324 has a passage which, when in the "run" position, connects pipes 335 and 336 which bypass a check valve 337 in the return line from the motor. In the "off" position, this connection is blocked, and a passage in the valve section 325 connects the pipe 336 with a pipe 338 running from the supply line 301, whereby a passage is opened for circulation of the working fluid delivered from pump 295, of less resistance than that through the motor 113a and check valve 337. Similarly the valve sections 326 and 327 in conjunction with pipes 339, 340, 341 and check valve 342, cause the motor 113 to be started and stopped. The valve section 328 is inserted between pipes 343 and 344, forming an element of the interlocks previously mentioned. The valve 329 passes pressure fluid through a pipe 345 to prevent operation of the start button 321 when in the "off" position, and admits fluid through a pipe 346, to prevent operation of the jog button 323 when in the "run" position. It provides an exhaust passage back to the tank from either line when the other is connected to the source of pressure.

Turning now to the work carriage circuit, the pressure line 303 is connected to the reversing valve 173 through two intake ports 347 and 348, and the return line 304 is connected with an exhaust port 349. Valve 173 has two outlet ports 350 and 351, of which the former is connected by a pipe 352 with the lefthand end of the valve casing, and the latter by pipe 353 with the right hand end of the valve casing. Port 350 is likewise connected through pipe 354 with the right hand end of the carriage motor cylinder 172, and through pipe 355 with the right hand end of a reversing valve 356 which controls the timing and direction of rotation of the former-impelling motor 200. The other outlet port 351 of the carriage reversing valve is connected by pipes 357 and 358 with the left hand end of the carriage motor and former-reversing valve, respectively. Connections lead from outlet ports 359 and 360 of the former-reversing valve to the admission and exhaust ports of the motor 200. Alternative connections, controlled by valves 361 and 362 enable either port 359 or 360 to be connected with either the admission or exhaust port of the motor, for changing the order of torque application of the former with reference to the direction of travel of the carriage. The exhaust ports of the former-reversing valve are connected through pipe 363 with an adjustable spring loaded relief valve 364 having an outlet to the reservoir. The intake port of valve 356 receives pressure fluid from the accumulator pump 297 through the line 306 and a branch 365.

All of the pumps except the accumulator pump 297 operate on closed circuits. The latter pump delivers fluid to the line 306 at a pressure determined by appropriate design and setting of its spring 308 and plunger 309. This pressure must have a sufficient differential over back pressures applied to certain valves of the system, to cause their operation with certainty, and may be substantial; for instance, in the order of 500 pounds per square inch, although it may have any other operative value. A branch 366 from this line is connected through a choke coil 367 or equivalent resistance to a line 368 in which pressure is maintained at a low value above atmospheric (for example, 50 pounds per square inch), by a relief valve 369 having an outlet to the reservoir. Outwardly opening check valves 370 connect this line with the circuits of pumps 294, 295 and 296 to make up leakage losses in those circuits and to eliminate air from the system. A connection 371 leads from the line 368 to the dresser reverse valve 110 and has branches connecting with intake ports 372 and 373 thereof. Connections lead from an outlet port 374 of this valve to the two dresser motor cylinders 105, the wheel stool feeding motor 72, and to the dresser slide feed motors 101 to maintain a back pressure on the pistons therein when the grinding operations are going on. The line 368 leads to the index motor control valve 210, and a line 375 leads from said valve to the connection 275 of the timer propelling plunger 273. A bypass 376 is connected with the lines 368 and 375 at opposite sides of valve 210, and with the indexing motor. In the normal position of valve 210, an open connection is made between lines 368 and 375. This connection is closed when the valve is shifted by the means previously described at the end of each return rolling movement of the work. A connection 377 from the line 306 to the valve is normally closed but, when the valve is shifted for indexing, this connection is opened to the indexing motor, and thence to line 376, whereby high pressure fluid is delivered both to the index motor and to the timer operating plunger 273.

Branches 378 and 379 lead from the pressure line 306 to the valves 150 and 153 by which the alternative, fluid operated, form of work holding center is controlled.

Another branch 380 from the high pressure line 306 leads through a choke or restriction 381 to the passage 80 in the base of the machine which leads counterbalancing fluid pressure to the stool. Such pressure is regulated by an adjustable relief valve 382.

Another branch 383 leads from line 306; and from this, secondary branches 384, 385, 386 and 387 lead to the several timer-operated valves 268-271, and to shuttle valves 388-391 interposed in the connections between said valves and the feed plungers 241-243 and 257. A line 392 in the high pressure system leads to a port in the casing of a slide valve 393 which is operated by the starting button 321.

A back pressure line 394 is connected with the high pressure line 306 through a choke coil or equivalent obstruction 395 and pressure is maintained therein at any desired lower level by the adjustable relief valve 396. A pipe 397 leads from this line to the back pressure connection 276 of the timer operating motor to return the plunger 273 therein to starting position after the driving operation. Another pipe or branch 398 leads to the valve unit 329, and other connections 399, 400 and 401 lead to automatic valves which constitute the interlocks previously referred to.

The starting button 321 and jog button 323 operate slide valves 393 and 402 connected in series in a bypass from the carriage operating circuit consisting of pipes 403, 404, 405 and 406, and of which pipes 403 and 404 are in open connection with the lines 343 and 344 respectively. Another bypass in the same circuit consists of the pipe 403, part of 406, a branch 407 leading to 406, and three automatic valves interposed between 403 and 407. The valves are, respectively, a "position" valve 408, an "automatic stop" valve 409 and an "automatic restart" valve 410. The "position" valve 408 is in both bypass circuits and is connected to receive operating pressure fluid at the end opposite to the end to which pipe 401 is connected, through a line 411 when the index motor controlling valve 210 is shifted. These several valves are provided with lands and chambers or ports arranged to open and close the circuits in which they are located. Hence when all three in either bypass circuits are in open position at the same time, the output of pump 296 circulates through such open bypass and cannot drive the work carriage and its reversing valve. But when both bypasses are closed, the carriage will be moved.

There are also a valve 412 for controlling the main valve lock 334, and a controlling pilot valve 413 therefor. The valve 412, which may be called the main valve lock controller, has separated ports 413 and 414, both connected with the back pressure branch line 399, an intermediate port connected to a line 415 which leads to the lock section 330 (which has passages admitting flow to the detent 334 whether the main valve is in the "run" or the "off" position) and an exhaust connection to the reservoir. The pilot valve has a port 416 at one end connected to branch 399, an intermediate connection 417 with the end of the lock controller valve remote from the port 413, a connection 418 with the starting button valve 393, a port 419 connected to a line 420 which runs to the shuttle valve 391, and an exhaust connection to the reservoir.

*Operation.*—When the machine is at rest, but ready to be started, the work carriage is at the end of its return travel, (here represented as the right hand end), the main valve is in the "off" position; the stop, start and jog buttons, with their associated valves, are in their outward or forward positions, (being yieldingly held there by springs shown in the diagram); the motor index valve 210 is in the lifted position, (wherein it connects the pressure branch 377 with the line 411); and the timer operated valve 271 is in its displaced position in engagement with one of the timer cams 272. The first starting step is to start the pump driving motor 298. The wheel driving pumps 294 and 295 then circulate oil through the wheel bypass circuits, and the carriage driving pump 296 circulates fluid through a bypass circuit comprising the lines 403, 343, a valve section 328, (which is then open), lines 344 and 405, the jog and start valves 402, 393, and connection 406. The accumulator pump 297 builds up the prescribed pressures in the lines 306, 368, 394 and their respective branches. In this condition the jog button 323 can be depressed to start and stop at will the carriage and the parts which are controlled by the carriage reversing valve, without actuating any other parts. The start button cannot then be depressed because the switch valve section 329 is in the position which conducts back pressure through line 345 to the rear end of valve 393 and opens line 346 from the jog button valve 402 to its exhaust connection with the reservoir.

The next starting step is to shift the main valve into the "run" position, in which it is instantly locked by pressure transmitted through line 415, the control valve 412 therefor being in the position shown. The wheel spindle motors are then caused to start and run at prescribed speed, the bypassing connection through the valve section 328 is closed, and the switch valve section 329 allows pressure from line 398 to be applied to the jog button valve, holding it in the position shown, and releasing the holding pressure from the valve 393 to the reservoir. Then the starting button is depressed, placing valve 393 in the position shown. This closes the bypassing connection 405 and causes the carriage to be started; the bypass through 407 being already closed by the automatic valve 409 under pressure from the branch 400 of line 394.

The automatic cycle now commences, and continues until the work piece is finished. At the end of each carriage stroke to the left, its dog 175 strikes the adjacent protruding stem of the slide valve, moving it to the position shown, whereby connections to the motor cylinder 172 and to the former-reversing valve are opened through the lines 357 and 358, valve 356 is put in the position shown, and pressure is admitted to turn the former-impelling motor in one direction. At the end of the carriage stroke to the right, the dog 174 strikes the other protruding valve stem, shifting the slide valve to the position shown in Fig. 15, and opening connections 354 and 355 to the motor cylinder 172 and reversing valve 356. At the end of each return trip of the carriage, the index valve 210 is opened, admitting pressure to the index motor and to the timer drive, causing the work to be indexed and the timer drum to be turned through an angle proportional to the number of teeth of the work. At the same time the position valve 408 is shifted by pressure from connection 411 to open position with respect to the bypass line 406. After a predetermined number of teeth have been ground, one of the cam contacts 272 of the timer shifts one of the feed control valves, for instance, valve 268. Fluid from the branch 385 of the high pressure line is thus admitted to a connection 422 and transmitted to the shuttle valve 388, raising that valve to connect the pressure branch 387 with the feed valve 244 through a pipe 423. Piston 241 is thereby advanced to impart an increment of movement to the abutments 178 and 179. At the same time shuttle valve 388 connects the pressure branch with a line 424 which leads to the automatic stop valve 409 at the end thereof opposite to that to which the back pressure branch 400 is connected. The higher pressure transmitted through line 424 shifts valve 409, (the automatic stop valve), into the position which provides a through passage between the adjoining sections of the line 406. The bypass 403, 407, 406 is thereby opened, short circuiting the carriage and causing the latter to stand still while the grinding wheels are adjusted and dressed.

The line 424 is connected through a choke or resistance 425 with a line 426 coupled with two separated intake ports 427 and 428 in the dresser reverse valve 110. At this time said valve is positioned to connect port 427 with a delivery port 429 from which a pipe line 430 leads, having conections with the two dresser motor cylinders 105, the wheel stool feed cylinder 72 and the dresser carriage adjusting cylinders 101. The connections with the two dresser motor cylinders made through choke resistances 431, wherefore operation of said motors is delayed until after the pistons in cylinders 72 and 101 have been operated. Thereby the wheels and dressers are first placed so that the wheel faces, after being dressed, will be in exactly the correct locations. The dresser cylinders are moved away from the fixed brackets 109, to which their pistons are secured, sweeping the dressers across the faces of the respective wheels; and the reversing valve 110 is carried by one of the cylinders toward the fixed dog 111. The valve slide is arrested by engagement of its protruding stem 432 with dog 111 while the valve casing continues to advance, until the shoulder or land 433 of the valve slide, (which is narrower than port 427), opens this port to the adjacent, or left hand, end of the valve casing. The fluid pressure then shifts the valve slide to couple the intake port 428 with the delivery port 374, and couple port 429 with port 372. Working pressure is then transmitted through the line 434 and branches to the opposite ends of the respective cylinders for reversing their action.

During return movement of the valve 110, its stem 435 protrudes toward the stationary dog 112 and is held stationary thereby during the last part of the movement until the valve casing brings up against the dog. However, this stem does not protrude far enough to cause reversal of the flow connections through the valve, but is only enough to cause substantial blocking of the ports 427 and 428.

Up to this time, owing to the resistance or choke 425, the pressure in line 426 has not been any higher than that in the line 394 and its branch 400; hence has not been enough to shift the automatic restart valve 410, which is connected with a branch 436 also leading from the choke 425. But with blocking of the ports 427 and 428, pressure is allowed to build up in the lines 426 and 436 until it is sufficient to shift valve 410 to the left from the position shown, and block the lines 407—403. The carriage is then caused to resume its reciprocations. Thus the stoppage of the carriage while adjustment and dressing of the wheels take place is controlled by the wheel dressing equipment, with assurance that carriage reciprocation will not be resumed until the dressing action has been completed.

After a further number of carriage reciprocations, always less than the number between any two feeding steps, the engaging cam member passes away from the valve 268, allowing the latter to return and cut off the pressure line 385 and connect the shuttle valve transmission line 422 with the reservoir. The shuttle valve is then returned to closed position by pressure from the line 394 acting through a branch 437. The pressure in lines 424, 426 and 436 then subsides, being released to the reservoir through a choke 438. The low pressure in line 368 transmitted through port 373, is then able to shift the slide of reversing valve 110 into the operating position shown. During such shift, liquid entrapped in the left hand end of the valve casing is released to the reservoir through a choke 439.

All subsequent operations of valves 268, 269 and 270 during the cycle of the timer, and their effects, are exactly the same as here described, and the combinations of these valves with their respective shuttle valves and abutment feeding motors are identical in principle with those just described, and are so shown in the drawings. Also the final assemblage of valve 271, shuttle valve 391, feed motor 259, with their interconnections, which are operated by the timer at the end of the cycle, are identical with one exception. The exception consists in that the line 420 and a branch 440 from the line 426 are connected to the shuttle valve 391 at points which are put into flow communication when the shuttle valve is displaced to admit pressure fluid to the motor cylinder 259 and the line 424. Thus, when valve 271 is shifted, not only are the abutments returned to original position and the wheel dressing and placing actions performed, but also the pressure which is built up in the line 426 on completion of the dressing action is transmitted through line 420, the pilot valve 413 and connection 417 to the lock control valve 412 so as to move the slide member of the latter to the right from the position shown in the drawing and connect the line 415 with the the exhaust port 441. The pressure acting on the locking detent 334 is thereby relaxed and the main valve is thereupon thrown by its spring to the "off" position, stopping the wheel motors and connecting the line 394—398 with line 345. Pressure is thus applied to the start button valve 393, pushing it outward and opening the bypass line section 405. Then, as the position valve 408 is already in open position with respect to the line 403, the bypass 403, 404, 405, 406 in the carriage driving circuit is opened.

Shifting of the valve 393 to forward position also connects the pressure line 392 with the line 418 to the left hand end of pilot valve 413, whereby the slide of the latter is moved to the right, connecting the exhaust port 442 thereof with the connection 417, enabling the lock control valve 412 to return to its normal position. Pressure is thus restored to the main valve lock 330, in readiness to secure the main valve when next it is turned to the "run" position.

Thereafter, so long as the machine stands at rest, the trip valve 271 and shuttle valve 391 remain in their respective open positions last described, whereby pressure is constantly applied through the line 424 and its branches, including the coupled lines 440 and 420. Line 420 is connected with the left hand end of valve 413 through a choke 443, whereby the valve slide is maintained in its displaced position after the start button is pushed in to restart the machine. Whatever fluid may leak through valve 413 is thus replenished. Shuttle valve 391 remains open after starting of the machine until the timer has been turned in successive steps far enough to displace the cam element which then engages trip valve 271 from such engagement.

The stop button 322 may be pushed in to stop the carriage at any time while the machine is running. This button is part of a valve slide 444 normally held by a spring in the position shown, wherein it makes a connection between the line 398 and a pipe 445 which opens into a series of passages in the starting valve slide. These passages conduct pressure to force detent balls 446, carried by said slide, into recesses in the valve casing with which they register when the starting button is pushed in, locking the slide. Inward movement of the stop button plunger disconnects pipe 445 from the line 398 and connects it with an exhaust port 447, whereby the pressure on the detent 446 is relaxed and the spring 448 thereby enabled to push the valve slide forward. Thereby the part of the bypass line 403, 404, 406 controlled by the starting valve is opened; and when next the carriage arrives at the end of a return stroke, the position valve 408 is opened and the carriage is stopped. It remains so until the starting button is again pushed in.

The foregoing description of a hydraulic system for driving and controlling this machine is not to be construed as a limitation of the generic principles and characteristics of the invention. Hydraulic operation has many useful qualities, among which are the exertion of large powers through motive means of relatively small dimensions and bulk, the simple and accurate control of speeds of moving parts, and correlative timing of such parts by valves and restrictions in the pipe lines, and the steady and substantially vibrationless conversion of fluid pressure into motion. But other powers and means of transforming force into motion are within my contemplation and the scope of claims not otherwise definitely limited. Also such features and combinations of the machines as are applicable to other purposes than those described herein, (for instance, the finishing of gears by other tools than grinding wheels, the finishing of machine elements other than gears by grinding wheels or other tools), are claimed here for all purposes and uses to which they may be put.

What I claim and desire to secure by Letters Patent is:

1. A machine for finishing gears and the curved faces of machine elements similar or analogous to gear teeth comprising a support, a work carriage mounted to reciprocate on said support, a work spindle rotatably mounted in the carriage with its axis transverse to the directions of carriage reciprocation, two rotary cutting tools mounted with their peripheral portions in position to act on different parts of a work piece carried by said spindle in the course of reciprocations of the carriage, a cam or former mounted on the carriage with capacity for angular movement and connected with the work spindle for transmission of angular movement thereto, said former having contact faces at opposite sides, and relatively stationary abutments mounted on the support flanking the former for engagement alternately by the contact surfaces thereof, whereby one of said abutments is caused to impart rolling movement to a work piece carried by the work spindle during travel of the carriage in one direction, and the other abutment is caused to impart opposite rolling movement to the work piece during travel of the carriage in the opposite direction, said abutments having plane contact faces contiguous to the former and being adjustable angularly to place said faces at various inclinations to the path of the carriage.

2. In a machine for finishing gears and other machine elements like or analogous to gear teeth, a supporting structure, a rotatable work spindle, a pair of rotatable cutting tools adapted to generate and cut curved surfaces on a work piece carried by said spindle in consequence of relative rolling movements in opposite directions between said tools and work spindle, an angularly movable former mounted and coupled with the spindle to impart rotation to the spindle, abutments having plane contact surfaces extending transversely of the translative component of said rolling movements at respectively opposite sides of the former for alternate engagement therewith in consequence of relative travel in opposite directions, and being angularly adjustable to place said surfaces at various angles to such translative component, and means for effecting relative translative displacement alternately in opposite directions between the spindle and former on the one hand and the cutting tools and abutments on the other hand.

3. In a machine of the character and for the purposes set forth, the combination of a supporting structure, a carriage mounted to reciprocate on said structure, a work spindle and a former supported rotatably on the carriage and coupled together for transmission of angular movement from the former to the spindle, said former having contact faces on opposite sides, abutments mounted on the supporting structure flanking the former in position to be engaged each by one of said contact faces, having plane contact faces transverse to the path of carriage travel and being angularly adjustable to put such faces at various angles to said path, means for reciprocating the carriage in a path such that the former is enabled to bear on the abutments alternately with travel of the carriage in opposite directions, and means for shifting the abutments toward and away from each other.

4. In a machine of the character and for the purposes set forth having a pair of cutting tools and a work spindle mounted for relative displacement such as to effect rolling movement between the cutting faces of said tools and a work piece mounted on said spindle, means for effecting such relative displacement in opposite directions, and means for simultaneously imparting controlled rotational movement to the spindle in harmony with said translative movements; said rotation controlling means comprising a former coupled with the spindle and having opposite contact faces and abutments flanking the former and having contact faces arranged to be engaged each by one of said former faces, said abutments being angularly adjustable to incline such faces more or less to the path of said relative displacement and also being shiftable to provide a greater or less extent of lost motion between their faces and the former, whereby to cause feeding increments of rotation to the spindle additional to the rotational movements controlled by the engagement of the former with the abutments.

5. In a machine of the character and for the purposes set forth, a supporting structure, a carriage mounted to reciprocate on said supporting structure, a work spindle mounted rotatably in said carriage, a former coupled with said spindle for rotating, and controlling rotation of, the spindle, an abutment mounted on the supporting structure in position to be engaged by the former, motive means acting on the carriage to move it back and forth, and other motive means acting on the former independently of the carriage-motive means to maintain contact of the former with the abutment during travel of the carriage in one direction.

6. In a machine of the character and for the purposes set forth, a supporting structure, a carriage mounted to reciprocate on said supporting structure, a work spindle mounted rotatably in said carriage, a former coupled with said spindle for rotating, and controlling rotation of, the spindle, an abutment mounted on the supporting structure in position to be engaged by the former, motive means acting on the carriage to move it back and forth, and other motive means acting on the former independently of the carriage-motive means to maintain contact of the former with the abutment during travel of the carriage in one direction, said former-motive means being reversible to cause such engagement during the travel of the carriage in the opposite direction, whereby to effect progressive cutting action on the work piece either from the inner toward the outer portion of such work piece or from the outer toward the inner portion thereof.

7. In a machine of the character and for the purposes set forth, a supporting structure, a carriage mounted to reciprocate on said supporting structure, a work spindle mounted rotatably in said carriage, a former coupled with said spindle for rotating, and controlling rotation of, the spindle, having contact faces at opposite sides, abutments mounted on the supporting structure flanking said former in positions to be engaged respectively by the opposite contact faces of the former, motive means coupled with the carriage for moving it back and forth, and other motive means coupled with the former for turning it independently of the carriage movements, said last named means being reversible to cause engagement of the former with one of the abutments during travel of the carriage in one direction and with other abutment during travel of the carriage in the opposite direction.

8. In a machine of the character and for the purposes set forth, a supporting structure, a carriage mounted to reciprocate on said supporting structure, a work spindle mounted rotatably in said carriage, a former coupled with said spindle for rotating, and controlling rotation of, the spindle, having contact faces at opposite sides, abutments mounted on the supporting structure flanking said former in positions to be engaged respectively by the opposite contact faces of the former, motive means coupled with the carriage for moving it back and forth, other motive means coupled with the former for turning it independently of the carriage movements, said last named means being reversible to cause engagement of the former with one of the abutments during travel of the carriage in one direction and with the other abutment during travel of the carriage in the opposite direction, and means for shifting the abutments whereby to permit increments of angular feeding movement to be imparted to the spindle in addition to the component of rolling movement produced by the former while engaged with either abutment.

9. A gear grinding machine comprising grinding wheels rotatably mounted and arranged with their active faces in locations corresponding to two tooth faces of a rack, a work spindle rotatably mounted and adapted to support a gear with two of its tooth faces respectively adjacent to the grinding wheels, motive means for effecting a relative translative movement between the grinding wheels and spindle in directions transverse to the spindle axis and to the grinding wheel faces, a former coupled with the spindle for controlling rotational movement thereof, motive means coupled with said former for imparting rotary movement thereto independently of the carriage movement, abutments in relatively fixed locations with reference to the grinding wheels at respectively opposite sides of and near the former, and means for reversing said former motive means when the carriage movement is reversed in direction.

10. A gear grinding machine comprising grinding wheels rotatably mounted and arranged with their active faces in locations corresponding to two tooth faces of a rack, a work spindle rotatably mounted and adapted to support a gear with two of its tooth faces respectively adjacent to the grinding wheels, motive means for effecting a relative translative movement between the grinding wheels and spindle in directions transverse to the spindle axis and to the grinding wheel faces, a former coupled with the spindle for controlling rotational movement thereof, motive means coupled with said former for imparting rotary movement thereto independently of the carriage movement, abutments in relatively fixed locations with reference to the grinding wheels at respectively opposite sides of and near the former, means for reversing said former motive means when the carriage movement is reversed in direction, and means for moving the abutments toward and away from the former whereby to enable an increment of angular feed movement to be imparted to the gear in addition to the rolling movement produced by the interaction of the former and abutments.

11. In a machine of the character described, the combination of a base, a carriage mounted to reciprocate on said base, a work spindle and a former rotatably mounted on the carriage and coupled together for transmission of angular movement from one to the other, the former being disposed to turn in a plane substantially parallel to the path of carriage movement, an abutment on the base adjacent to the former, in position to be pressed against by the former, a motor connected with the carriage for imparting reciprocating movement thereto, and a second motor coupled with the former for imparting rotary movement thereto independently of the movements of the carriage.

12. In a machine of the character described, the combination of a base, a carriage mounted to reciprocate on said base, a work spindle and a former rotatably mounted on the carriage and coupled together for transmission of movement from one to the other, an abutment on the base adjacent to the former, a motor connected with the carriage for imparting reciprocating movement thereto, a second motor coupled with the former for imparting rotary movement thereto independently of the movements of the carriage, said motors being reversible, and correlated means for reversing both motors approximately at the same time.

13. A gear grinding machine comprising a supporting structure, a carriage mounted for reciprocating movement on said supporting structure, a work spindle rotatably mounted on said carriage and adapted to hold the work gear, a grinding wheel mounted on the supporting structure in position to act upon a gear secured to said spindle during linear travel of the carriage, a former rotatably mounted on the carriage and coupled to the work spindle for imparting rotary movement to the spindle about its axis, driving means operatively associated with the carriage for moving the same in its prescribed path, an abutment mounted on the supporting structure in the path of rotation of said former, and means for applying torque to the former in the opposite direction to that in which the abutment causes the former to rotate in consequence of linear movement of the carriage.

14. A gear grinding machine comprising a supporting structure, a carriage mounted on said structure and movable back and forth thereon in a prescribed path, a work spindle rotatably mounted on the carriage with its axis of rotation transverse to the path of the carriage and adapted to hold a work gear, a grinding wheel mounted on the supporting structure in position to perform a cutting action on a work gear carried by the spindle when the carriage is translated in its prescribed path, a former rotatably mounted on the carriage and coupled with said spindle for transmitting rotation thereto, abutments mounted on the supporting structure embracing the former with a space between their adjacent boundaries wider than the embraced portion of the former, means for moving the carriage in its path, and reversible torque applying means operatively associated with the former for pressing it against either of the abutments when the carriage travels in one direction.

15. A gear grinding machine of the type in which the gear to be ground is rolled across the rim of a rotating grinding wheel having an active face lying substantially in a plane, said machine having means for causing the work gear teeth to be ground either from the root portion toward the tip portion, or vice versa, said means comprising a spindle on which the gear to be ground is mounted, a reciprocable carriage in which the spindle is rotatably mounted, a former on the carriage coupled with the spindle for transmission of rotation thereto, a relatively stationary abutment beside the former to be engaged thereby, and torque applying means tending to rotate the former relatively to the carriage, said torque applying means being reversible so that when organized to apply torque toward the abutment during the carriage travel in one direction it causes the grinding effect on the work gear tooth to progress in root-to-tip direction, and when organized to apply torque toward the abutment while the carriage travels in the opposite direction, it causes the grinding effect to proceed in the tip-to-root direction of the work gear tooth.

16. A gear grinding machine comprising a base, a grinding wheel stool and a work carriage mounted on said base, a grinding wheel rotatably supported by the stool, the carriage being reciprocably mounted to travel in directions transverse to the grinding wheel and having means to support a work gear rotatably with a tooth thereof in position to be engaged by the grinding wheel, and means for reciprocating the carriage and simultaneously rotating the work gear at speeds suitable for rolling the gear across the grinding wheel, the stool being a unitary structure having an extension of external cylindrical form and the base having a bearing in which said extension fits slidingly for endwise and rotary movement, whereby the stool is adjustable toward and away from the path of the work gear and also angularly to adjust the grinding wheel to gears of different helix angles.

17. A gear grinding machine comprising a base, a grinding wheel holder and a work carriage mounted on said base, the carriage being disposed as a bridge over the wheel holder, a grinding wheel rotatably supported by the holder, the carriage being reciprocably mounted to travel in directions transverse to the grinding wheel and having means to support a work gear rotatably above the grinding wheel with a tooth thereof in position to be engaged by the grinding wheel, and means for reciprocating the carriage and simultaneously rotating the work gear at speeds suitable for rolling the gear across the grinding wheel, the holder being adjustable up and down toward and away from the path of the work gear and being combined with counterbalancing means.

18. In a finishing machine of the character set forth, a base, a stool mounted on the base with provision for movement up and down and for angular adjustment about the axis of its up and down movement, a rotatable operating tool mounted on the stool, screw means coaxial with the center of angular adjustment for adjusting the stool up and down, and counterbalancing means organized to relieve said adjusting screw of a substantial part of the weight of the stool.

19. In a finishing machine of the character described, a base, a stool having sliding and rotatable engagement with the base for up and down movement and angular adjustment about the axis of up and down movement, a rising cylinder and piston combination of which one member is supported by the base and the other is connected to the stool coaxial with the axis of angular adjustment, means for introducing fluid under pressure between the cylinder and piston in a manner to counterbalance a substantial part of the weight of the stool, means for adjusting the stool in the up and down direction, and means for turning the stool about said axis.

20. In a machine of the character described, a base, a stool adapted to carry a cutting tool mounted in the base and connected therewith for up and down movement, a rising cylinder mounted in the base, a piston secured to the stool fitting said cylinder, a screw element carried by the piston and arranged to transmit thrust from the piston to the stool, said screw element having threads engaging the cylinder and being rotatable to effect adjustment of the stool, and means for introducing fluid under pressure into the cylinder beneath the piston so as to relieve said screw threads of a substantial part of the weight of the stool.

21. A machine tool of the character set forth comprising a base, a stool having rotative up and down sliding connection with the base, a band surrounding the stool and having splined engagement with the base and being provided with means for loosening and tightening it about the stool whereby to permit adjustment of the stool and to make fast the angular settings thereof.

22. A machine tool of the character described comprising a base, a stool having a body portion of circular cross-section and of relatively large diameter and a coaxial sleeve portion mounted rotatably and endwise slidably in the base, a gear element surrounding said sleeve portion in rotation-transmitting engagement therewith, a cooperating gear element meshed with the foregoing gear element for imparting rotation thereto and to the stool, a band surrounding the main body of the stool in splined engagement with the base and being constructed with provisions for being loosened and tightened around said body, and adjusting means reacting between the stool and base for moving the stool in the axial direction.

23. A machine tool of the character described comprising a base, a stool having a body portion of circular cross section and a coaxial sleeve portion mounted rotatably and endwise slidably in the base, a gear element surrounding said sleeve portion in rotation-transmitting engagement therewith, a cooperating gear element meshed with the foregoing gear element for imparting rotation thereto and to the stool, a band surrounding the main body of the stool in splined engagement with the base and being constructed with provisions for being loosened and tightened around said body, adjusting means reacting between the stool and base for moving the stool in the axial direction, and hydraulic means for applying a counterbalance to the weight of the stool whereby to relieve the adjusting means of such weight.

24. A grinding machine comprising a supporting structure, a carriage mounted to reciprocate on said structure, hydraulic means coupled with the carriage for reciprocating it, a work spindle rotatably mounted on the carriage to turn about an axis extending transversely of the path of carriage reciprocation, a hydraulic motor coupled with said spindle for applying torque thereon, means for limiting rotation of said spindle to a rate correlated with the rate of travel of the carriage, a grinding wheel, and a hydraulic motor coupled with the spindle of the grinding wheel for imparting rotation thereto.

25. A grinding machine comprising a supporting structure, a carriage mounted to reciprocate on said structure, hydraulic means coupled with the carriage for reciprocating it, a work spindle rotatably mounted on the carriage, a hydraulic motor coupled with said spindle for applying torque thereon, a grinding wheel, a hydraulic motor coupled with the spindle of the grinding wheel for imparting rotation thereto, a manual controller for stopping and starting the motion of the carriage, and automatic means to prevent action of such manual controller when the grinding wheel is in motion.

26. A grinding machine comprising a supporting structure, a carriage mounted to reciprocate on said structure, hydraulic means coupled with the carriage for reciprocating it, a work spindle rotatably mounted on the carriage, a hydraulic motor coupled with said spindle for applying torque thereon, a grinding wheel, a hydraulic motor coupled with the spindle of the grinding wheel for imparting rotation thereto, a dresser mounted adjacent to the grinding wheel having a dressing element movable across the face thereof, a hydraulic motor for actuating said dresser, and correlated control means for interrupting the reciprocations of the carriage, causing operation of the dresser motor, and resuming reciprocations of the carriage after completion of the dressing action.

27. A grinding machine comprising a supporting structure, a carriage mounted to reciprocate on said structure, hydraulic means coupled with the carriage for reciprocating it, a work spindle rotatably mounted on the carriage, a hydraulic motor coupled with said spindle for applying torque thereon, a grinding wheel, a hydraulic motor coupled with the spindle of the grinding wheel for imparting rotation thereto, a dresser mounted for movement back and forth across the active face of the grinding wheel, a hydraulic motor for so moving the dresser, said dresser and its motor being adjustable in a path leading toward the plane in which said active face lies, hydraulic motive means for adjusting the dresser in said path, and correlated controlling means for causing a series of actions of the carriage and spindle motors, then suspending the actions of said motors, then actuating the dresser adjusting motor and the dresser propelling motor, during intermission of the carriage movements and causing the carriage to resume its movements.

28. A grinding machine comprising a supporting structure, a carriage mounted to reciprocate on said structure, hydraulic means coupled with the carriage for reciprocating it, a work spindle rotatably mounted on the carriage, a hydraulic motor coupled with said spindle for applying torque thereon, a grinding wheel, a hydraulic motor coupled with the spindle of the grinding wheel for imparting rotation thereto, a stool on which said grinding wheel is supported, hydraulically operated means for adjusting the stool for altering the position of the grinding wheel face with reference to the path of the work piece, a dresser mounted on the stool having a dressing element arranged to sweep across the said active face, hydraulic means for so propelling the dresser, hydraulic means for adjusting the dresser on the stool in a direction to feed the dresser toward the wheel, and correlated means for interrupting the action of the carriage and spindle motors and, during such an interruption, actuating the hydraulic stool adjusting, dresser adjusting, and dresser propelling means.

29. In a grinding machine, a spindle holder, a tool spindle rotatably mounted in said holder, a grinding wheel secured to the spindle, a hydraulic motor consisting of a casing and a rotor, a vibration damping resilient connection securing said housing to said spindle holder, and a vibration damping resilient coupling between said rotor and the spindle.

30. In a machine tool, a tool spindle housing, a tool spindle rotatably mounted in said housing, a cutting tool secured to said spindle, a motor having a housing and a rotor coaxially arranged with respect to said spindle adjacent to one end thereof, resilient vibration damping means connecting the motor housing with the spindle housing and a resilient vibration damping coupling between the rotor and the spindle in torque transmitting connection with both.

31. A gear grinding machine comprising two grinding wheels mounted with their active faces in a relation to each other corresponding to the relationship of two tooth faces of a rack, a work carriage, a work spindle rotatably mounted on said carriage, the carriage being movable in a path to roll a work gear across the rims of the grinding wheels with two tooth faces of the gear adjacent to the active faces of the two wheels respectively, a former coupled with the spindle for controlling rotation thereof during travel of the carriage having oppositely disposed contact faces, two abutments arranged at respectively opposite sides of the former for engagement by said contact faces with a space between wider than the spacing of said contact faces from each other, means for moving the carriage in opposite directions, and means for causing the former to bear on one of the abutments during movement of the carriage in one direction, and on the other abutment during movement of the carriage in the opposite direction; the excess spacing between the abutments causing one only of the before named gear tooth faces to engage one of the grinding wheels during travel of the carriage in one direction, and the other of said tooth faces to engage the other grinding wheel while the carriage travels in the opposite direction.

32. In a gear grinding machine having two grinding wheels, a carriage and a work spindle on the carriage organized to cause a relative rolling movement between a work gear on the spindle and the grinding wheels similar to the relative rolling movement between a gear and a rack in mesh, said grinding wheels being arranged cooperatively with respect to two tooth faces of the work gear, means for imparting the rotative component of such rolling movement to the work gear comprising a former coupled to the work spindle having opposite contact faces, two abutments arranged to embrace the former between them, and reversible motive means coupled with the former and spindle for applying torque to the spindle in opposite directions, the spacing between the abutments being greater than that between the opposite faces of the former, whereby upon each reversal of said motive means, one tooth face of the work gear is brought into contact with one grinding wheel and the other cooperatively located tooth face is withdrawn from the other grinding wheel.

33. A gear grinding machine comprising a grinding wheel, means for rolling a work gear across said grinding wheel in position to be acted on thereby, feed controlling means for causing increments of angular movement to be given to the gear following rolling movements thereof, a timer movable progressively and having provisions for causing actuation of said feed controlling means, and provisions whereby the rolling of the work causes said timer to be so advanced.

34. In a machine of the character set forth, a work carriage, a work spindle mounted on the carriage, an angularly movable former mounted on the carriage in rotation controlling connection with the spindle, means for applying torque alternately in opposite directions to said former, shiftable abutments at opposite sides of the former in position to be engaged alternately thereby with reversals in the direction of torque application thereto, said abutments being shiftable to provide greater or less lost motion between them and the former, a timer, means controlled by rolling movements of the work for advancing said timer, and means controlled by the advancement of the timer for causing the abutments to be shifted in the manner set forth.

35. A gear grinding machine comprising a carriage, a spindle supported on said carriage, a tail stock in pivoted connection with the carriage having a work supporting element movable with the tail stock into axial alinement with said spindle and also into a position at one side of the spindle axis, a lock holding the tail stock in the position where such axial alinement occurs, and a grinding wheel mounted in operative proximity to the prescribed location of a work gear between said head stock and tail stock.

36. In a machine tool of the character described, a support, a work spindle rotatably mounted on said support, a tail stock pivoted to the supporting structure and having a work engaging element adapted to be set in axial alinement with said spindle when the tail stock is in one of its positions of angular movement about its pivot, and to be swung with the tail stock to one side of the spindle axis, and a quickly engageable and disengageable lock cooperating between the tail stock and supporting structure for securing the tail stock in the before named position of alinement.

37. The method of gear grinding which consists in locating grinding means having a plurality of active faces in a relation to each other similar to that between two tooth faces of a rack, rolling a work gear forward and back across the rims of such faces so that one tooth face of the gear is adjacent to one active face and another tooth face is adjacent to the other active face, and controlling the angular component of rolling motion so that each of said tooth faces is ground exclusively in the root-to-tip direction in its traverse across the face of the respectively adjacent wheel.

38. Generating gears by the agency of grinding, which consists in effecting a relative rolling movement between the gear being ground and two grinding faces, related to each other as two tooth faces of a rack, in opposite directions with two tooth faces of the gear respectively adjacent to the said grinding faces, and imparting angular movements to the gear at the opposite ends of such relative rolling movement to displace one of said tooth faces from the grinding face thereto adjacent, while bringing the other of said tooth faces into position for making grinding engagement with the respectively adjacent grinding face.

39. The method of grinding gears, which consists in effecting a relative rolling movement between the gear being ground and grinding means having active faces related to each other as two tooth faces of a rack, in opposite directions with two tooth faces of the gear respectively adjacent to the active grinding faces, and imparting angular movements to the gear at the opposite ends of such relative rolling movement to displace one of said tooth faces from the adjacent active grinding face, while bringing the other of said tooth faces into position for making grinding engagement with the active grinding face adjacent thereto, said angular movements being effected in directions to cause grinding of each tooth face in the root-to-tip direction while traversing the respectively adjacent grinding face.

40. The method of gear grinding, which consists in effecting a relative rolling movement between the gear being ground and an active grinding face related to such gear as a tooth face of a rack in mesh with the gear, causing such rolling movement to occur repeatedly in opposite directions, indexing the gear to present different teeth to the grinding face for action thereby in the course of different rolling movements, causing the contact between each tooth and the grinding surface to occur when said relative movement is in the direction to cause progressive traverse of the grinding action in the root-to-tip direction of the tooth faces, and holding the teeth out of contact with the grinding surface when the rolling movement is in the opposite direction.

41. A grinding machine comprising a supporting structure, a carriage mounted to reciprocate on said structure, a hydraulic motor coupled with the carriage for reciprocating it, a work spindle rotatably mounted on the carriage, a hydraulic motor coupled with said spindle for applying torque thereto, means cooperating with said motor and carriage for correlating the rate of spindle rotation with the rate of carriage travel, a grinding wheel spindle rotatably mounted on the supporting structure, a grinding wheel mounted thereon in position to perform an operation on a work piece carried by the work spindle, and a hydraulic motor for driving said grinding wheel spindle having a casing in vibration-damping resilient connection with the supporting structure, and a rotor in vibration-damping resilient coupled connection with the grinding wheel spindle.

42. In a grinding machine, the combination of a supporting structure, a carriage structure mounted to reciprocate on the supporting structure, a grinding wheel spindle and grinding wheel supported thereby mounted rotatably on one of said structures, a work spindle mounted rotatably on the other of said structures, said spindles being arranged to effect operative traverse between a work piece on the work spindle and the grinding wheel in consequence of reciprocating movements of the carriage, and means for driving the grinding wheel spindle with substantial absence of vibration, comprising a hydraulic motor casing, a vibration-damping resilient connection securing said casing to the structure in which the grinding wheel spindle is mounted, a rotor coacting with said casing, and a vibration-damping resilient coupling between said rotor and the grinding wheel spindle.

43. A grinding machine comprising a supporting structure, a carriage mounted to reciprocate on said structure, a work spindle rotatably mounted on the carriage, cooperative motive means coupled to said carriage and work spindle for reciprocating one and oscillating the other in correlation to effect a prescribed compound movement of the spindle with respect to the supporting structure, a tool spindle mounted rotatably on the supporting structure, a grinding wheel on the tool spindle in operative relation to the work spindle, and a motor for rotating the tool spindle comprising a stator, a rotor, resilient vibration-damping means connecting the stator to the supporting structure, and a resilient vibration-damping coupling between the rotor and tool spindle in torque transmitting connection with both.

44. In a machine tool of the character set forth, a base, a stool and a work carriage mounted on the base, an operating tool rotatably supported by the stool, the carriage being reciprocably mounted to travel in directions transverse to the plane of rotation of the tool and having means to support a work gear rotatably with a tooth thereof in position to be engaged by the tool, means for reciprocating the carriage and simultaneously rotating the work gear at speeds suitable for rolling the gear across the grinding wheel, the stool being mounted with provisions for movement toward and away from the path of the work gear, and hydraulic means arranged to exert force on said stool in the line of such movement.

45. In a finishing machine of the character set forth, a base, a stool mounted on the base with provision for movement up and down, an operating tool mounted on the stool, a hydraulic piston and piston casing, one of which is connected with the base and the other with the stool for the application of force hydraulically to the stool, and auxiliary means for controlling and limiting the movements imparted to the stool thereby.

46. A machine for generating the face curves of gear teeth and the like, comprising supports for a cutting tool and a work piece, one of which supports is linearly movable on the other in a prescribed path, a work spindle mounted on one of said supports to rotate about an axis transverse to said path, a cutting tool operatively mounted on the other support in position to perform a cutting operation on a work piece secured to the spindle in the course of a linear movement of the movable support together with angular movement of the spindle, means reacting between the supports during their relative linear movements for imparting angular movement to the spindle, including an index plate and a pawl, one of which is secured to the spindle and the other is free to turn about the spindle, and the pawl is engageable detachably with the index plate at different points around the center thereof, a normally passive hydraulic motor connected to the spindle and adapted to turn it when the pawl and index plate are disengaged, and correlated means by which the precedently named means causes disengagement between the pawl and plate and concurrently causes the motor to become active.

47. A machine for generating the face curves of gear teeth and the like, comprising supports for a cutting tool and a work piece, one of which supports is movable on the other back and forth in a prescribed path, a work spindle mounted on one of said supports to rotate about an axis transverse to said path, a cutting tool operatively mounted on the other support in position to perform a cutting action on a work piece secured to said spindle in the course of a linear movement of the movable support and correlated rotation of the spindle, an index plate secured to the spindle, a former rotatably mounted on the same support on which the spindle is mounted, an abutment mounted on the other support in position to engage the former and cause a predetermined angular movement thereof to occur simultaneously with linear movement of the movable support, a pawl connected with the former and engaged with the index plate for transmitting the angular movement of the former thereto, a normally inactive hydraulic motor connected to the work spindle for turning it when the pawl is disengaged from the index plate, and correlated means by which the former causes the pawl to be disengaged from the index plate and sets the motor in action substantially at the same time.

48. A machine for generating the face curves of gear teeth and the like comprising supports for a cutting tool and a work piece, one of which supports is movable on the other back and forth in a prescribed path, a work spindle mounted on one of said supports to rotate about an axis transverse to said path, a cutting tool operatively mounted on the other support in position to perform a cutting action on a work piece secured to said spindle, a former rotatably mounted on the same support on which the spindle is mounted, and abutments mounted on the other support to engage the former and cause a predetermined angular movement thereof to occur simultaneously with the linear movement of the movable support, an index plate secured to the spindle, an arm movable angularly around the axis of the spindle and being connected with the former to be moved thereby, a pawl carried by the arm disconnectibly engaged with the index plate for transmitting the angular movement of the former thereto, a normally passive hydraulic motor coupled with the spindle independently of the index plate, a normally closed control valve for said motor, and correlated means adjacent to said arm for disengaging the pawl from the index plate when the arm reaches a prescribed point in its angular movement, and thereupon opening the said valve, whereby the motor is caused to impart indexing rotation to the spindle.

49. A machine for generating the face curves of gear teeth and the like comprising supports for a cutting tool and a work piece, one of which supports is movable on the other back and forth in a prescribed path, a work spindle mounted on one of said supports to rotate about an axis transverse to said path, a cutting tool operatively mounted on the other support in position to perform a cutting action on a work piece secured to said spindle, a former rotatably mounted on the same support on which the spindle is mounted, and abutments mounted on the other support to engage the former and cause a predetermined angular movement thereof to occur simultaneously with the linear movement of the movable support, an index plate secured to the spindle, an arm movable angularly around the axis of the spindle and being connected with the former to be moved thereby, a pawl carried by the arm disconnectibly engaged with the index plate for transmitting the angular movement of the former thereto, a normally passive hydraulic motor coupled with the spindle independently of the index plate, a normally closed control valve for said motor, and a second arm pivotally mounted in normally stationary relation to the first-named arm, having a part extending across the path of a portion of the first-named arm, whereby the second arm is displaced when the first-named arm reaches a prescribed point in its angular movement, the second arm being disposed so as to open said valve when so displaced, and having means for disengaging the pawl from the index plate at substantially the same time.

50. A gear grinding machine of the type in which the gear is rolled across the rim of a rotating grinding wheel with a tooth face of the gear engaging an active face of the wheel adjacent to the rim thereof, said machine having means for causing the gear teeth to be ground in either the direction from root to tip or the direction from tip to root, and said means comprising a work spindle on which the gear to be ground is mounted, a carriage on which the spindle is rotatably mounted, said carriage being movable reciprocably in directions to carry the work past the grinding wheel, rotation controlling means coupled with the spindle, two abutments between which a portion of said rotation controlling means lies and is movable back and forth relatively to the carriage to engage either one exclusively, and reversible force applying means acting on said rotation controlling means and operable to cause said portion to bear against one abutment or the other exclusively while the carriage travels in one direction.

51. A gear grinding machine comprising a supporting structure, a carriage mounted on said structure and movable thereon in a prescribed path, a work spindle mounted rotatably on the carriage with its axis of rotation transverse to the path of the carriage, means for reciprocating the carriage in its path, a rotatable grinding wheel having an active face mounted on the supporting structure in position to act on a work piece carried by said spindle when the carriage travels, rotation controlling means coupled with the spindle including an element movable back and forth in a plane substantially parallel to the path of the carriage, abutments mounted on the supporting structure embracing said element in the path of movement thereof with provisions for adjustment toward and away from the element to limit and vary the extent of possible movement thereof, and means for applying force alternately in opposite directions to said rotation controlling means in time with the reciprocations of the carriage.

52. A machine for generating curved surfaces on work pieces by relative rolling traverse between a work piece and a grinding wheel, with a feeding step between successive actions of the grinding wheel on the same surface, comprising a supporting structure, a grinding wheel having a lateral active face mounted thereon, a carriage movable on the supporting structure in a path transverse to the active face of said wheel, a rotatable work holder mounted on the carriage in position to carry a work piece past and in cutting engagement with said active face when the carriage is moved in its path, and means for rotating and controlling the rotation of said work holder during travel of the carriage, comprising torque-applying means coupled with the work holder, a machine element also coupled with the work holder to move linearly relatively to the carriage when the work holder rotates, and an abutment mounted on the supporting structure in the path of linear movement of said machine element for limiting the movement thereof relative to the supporting structure, said abutment being adjustable to permit regulated increments of such relative movement.

53. A gear grinding machine comprising a supporting structure, a carriage mounted on said structure and movable thereon in a prescribed path, means on said carriage for holding and rotating a work gear including a rotatably mounted shaft arranged with its axis transverse to the path of the carriage and a machine element coupled with said shaft so as to have a linear movement relative to the carriage simultaneously with rotation of the shaft, abutments mounted on the supporting structure flanking said machine element across its path of movement, and a driving motor having parts coupled respectively with the carriage and shaft for applying torque to the shaft; and a grinding wheel mounted on the supporting structure in position to act on a work gear connected with said gear holding and rotating means.

54. In a machine of the character described having a supporting structure and a carriage mounted for reciprocating movement on said structure, a work spindle rotatably mounted on the carriage with its axis transverse to the path of movement thereof, a machine element mounted for movement relative to the carriage and supporting structure in generally the same directions as the reciprocating movements of the carriage, said machine element being coupled with the work spindle to impart angular movement thereto with respect to the carriage, and means reacting between the machine element and carriage for applying force to said machine element tending to move it relatively to the carriage.

55. A machine for finishing gears and the curved faces of machine elements similar or analogous to gear teeth in a plurality of cuts with feeding steps between successive cuts, comprising a supporting structure, a rotatable work spindle, a rotatable cutting tool adapted to generate and cut a curved surface on a work piece carried by said spindle in consequence of relative rolling movement between said tool and work spindle, means for effecting relative linear displacement between the spindle and tool in a direction transverse both to the spindle and to the plane of rotation of the tool, torque-applying means acting on the spindle tending to rotate it, an abutment mounted on the supporting structure, and a movable machine element in force-transmitting connection with the spindle arranged to be pressed against said abutment consequent to the action of said torque-applying means, the abutment being shiftable to permit displacement of said machine element.

56. A machine for finishing gear teeth and the curved faces of similar or analogous machine elements in a plurality of cuts with feeding steps between successive cuts, comprising a supporting structure, a rotatable work spindle, a rotatable cutting tool adapted to generate and cut a curved surface on a work piece carried by the spindle in consequence of relative rolling movement between said tool and work spindle, means for effecting relative linear displacement between the spindle and tool alternately in opposite directions in a path transverse to the spindle, the tool being so disposed as to rotate in a plane transverse to said path, torque-applying means acting on the spindle tending to rotate it, an abutment mounted on the supporting structure in normally stationary relation thereto, but with capability of being shifted in a prescribed path, a movable machine element in force-transmitting connection with the spindle arranged to be pressed against said abutment, in the general direction of the path of shift thereof, by the force exerted by said torque-applying means, and means controlled by the before-named means for shifting said abutment after one of said relative displacements, whereby to cause a feeding step of such a work piece.

57. A machine for finishing the curved surfaces of gear teeth and similar or analogous machine elements, comprising a supporting structure, a rotatable cutting tool mounted on said structure, a carriage mounted on said structure to reciprocate in directions transverse to the plane of rotation of said tool, a work spindle mounted rotatably on the carriage with its axis transverse to the directions in which the carriage reciprocates, a machine element movable back and forth relatively to the supporting structure and the carriage in force-transmitting association with the spindle, reversible motive means for reciprocating the carriage, separate reversible force-applying means acting on the machine element with tendency to displace the machine element and rotate the spindle, and abutments mounted on the supporting structure in locations to arrest the movements of said machine element in both directions, said abutments being adjustable to vary the distance through which the machine element can move.

58. A finishing machine as set forth in claim 57, combined with timing means operable to cause reversals of the action of said force-applying means in prescribed timed relation with reversals of said motive means.

59. A finishing machine as set forth in claim 57, combined with abutment adjusting means, timing means, and connections whereby the timing means causes said motive means and force-applying means to be reversed and the abutments to be shifted in a prescribed timed relation.

60. A machine for finishing the curved faces of gear teeth comprising a supporting structure, a rotatable cutting tool on said structure, a carriage reciprocable on said structure in directions transverse to the plane of rotation of said tool, a work spindle mounted rotatably on the carriage with its axis transverse to the directions in which the carriage reciprocates, a machine element movable back and forth relatively to the supporting structure and to the carriage in force-transmitting association with the spindle, reversible motive means for reciprocating the carriage, separate reversible force-applying means so engaged with said machine element and the spindle as to tend to displace the machine element and rotate the spindle, the engagement of the spindle with said force-applying means and machine element being disconnectible, abutments mounted on the supporting structure in position to arrest movements of the machine element in either direction and being shiftable to vary the distance through which the machine element can move, means controlled by the carriage for reversing said motive means and force-applying means, indexing means for imparting rotation to the spindle, a timer movable step by step, means controlled by the timer for shifting the abutments, and control means actuated by a part of the spindle rotating means for causing steps of movement to be imparted to the timer.

EDWARD W. MILLER.